(12) United States Patent
Hibi et al.

(10) Patent No.: US 12,435,972 B2
(45) Date of Patent: Oct. 7, 2025

(54) SURFACE MEASUREMENT APPARATUS AND SURFACE MEASUREMENT METHOD

(71) Applicant: NIPPON STEEL CORPORATION, Tokyo (JP)

(72) Inventors: Atsuhiro Hibi, Tokyo (JP); Yusuke Konno, Tokyo (JP); Nobuhiro Furuya, Tokyo (JP); Akihito Nakazaki, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 1007 days.

(21) Appl. No.: 17/609,341

(22) PCT Filed: Mar. 31, 2020

(86) PCT No.: PCT/JP2020/014861
§ 371 (c)(1),
(2) Date: Nov. 5, 2021

(87) PCT Pub. No.: WO2021/199299
PCT Pub. Date: Oct. 7, 2021

(65) Prior Publication Data
US 2022/0146254 A1  May 12, 2022

(51) Int. Cl.
*G01B 11/25* (2006.01)
(52) U.S. Cl.
CPC .................... *G01B 11/25* (2013.01)
(58) Field of Classification Search
CPC ....................................................... G01B 11/25
See application file for complete search history.

(56) References Cited

U.S. PATENT DOCUMENTS

| 10,527,410 B2 | 1/2020 | Akagi et al. |
| 10,605,591 B2 | 3/2020 | Konno et al. |
| 2018/0180405 A1* | 6/2018 | Konno .................... G01B 11/24 |

FOREIGN PATENT DOCUMENTS

| EP | 3 470 778 A1 | 4/2019 |
| JP | 4-160304 A | 6/1992 |

(Continued)

*Primary Examiner* — Jamil Ahmed
(74) *Attorney, Agent, or Firm* — Birch, Stewart, Kolasch & Birch, LLP

(57) ABSTRACT

To reliably measure a surface of an object to be measured having a wide width. A surface measurement apparatus that measures a surface of an object to be measured moving in a predetermined moving direction on a plane or a surface of an object to be measured moving in a predetermined moving direction along a curved surface of a roll, the surface being along the curved surface, the apparatus includes: N (N being an integer of two or more) light sources provided in a width direction, the light sources each emitting line beam over the width direction, which is a direction perpendicular to the moving direction; a screen on which reflected images of N pieces of the line beam reflected on reflection regions of the surface of the object to be measured respectively are projected; an image capturing device that captures the reflected image projected on the screen and acquires a captured image; and an arithmetic processing device that measures the surface of the object to be measured by using the captured image, in which the reflected images are projected on the screen to be distinguishable from each other.

6 Claims, 19 Drawing Sheets

(56) References Cited

FOREIGN PATENT DOCUMENTS

| | | |
|---|---|---|
| JP | 4081414 B2 | 4/2008 |
| JP | 2011-220827 A | 11/2011 |
| JP | 6278171 B1 | 2/2018 |
| JP | 6281667 B1 | 2/2018 |
| JP | 2020-51874 A | 4/2020 |
| WO | WO2017/204119 A1 | 11/2017 |

* cited by examiner

SURFACE MEASUREMENT APPARATUS AND SURFACE MEASUREMENT METHOD

TECHNICAL FIELD

The present invention relates to a surface measurement apparatus and a surface measurement method.

BACKGROUND ART

Conventionally, there have been surface measurement apparatuses that measure the surface of an object to be measured based on an optical lever (see, for example, Patent Documents 1 to 4). In such a surface measurement apparatus, line beam emitted from a light source is reflected on the surface of a moving object to be measured, a reflected image projected on a screen is captured by an image capturing device, and an obtained captured image is analyzed to measure the surface of the object to be measured.

PRIOR ART DOCUMENT

Patent Document

[Patent Document 1] Japanese Patent No. 4081414
[Patent Document 2] Japanese Patent No. 6281667
[Patent Document 3] Japanese Laid-open Patent Publication No. 04-160304
[Patent Document 4] Japanese Patent No. 6278171

DISCLOSURE OF THE INVENTION

Problems to be Solved by the Invention

In recent years, there has been a demand for measuring the surface of an object to be measured having a wide width. However, a single light source fails to emit line beam with a required wide irradiation width, thus causing a problem that it is impossible to easily handle the measurement of an object to be measured having a wide width.

Here, there has been disclosed a method of arranging a plurality of light sources to measure the surface of an object to be measured having a wide width (see, for example, Patent Document 1 above). However, an apparatus configuration, such as a specific arrangement of the light sources, is not disclosed. Further, as a result of earnest studies conducted by the present inventors, it has been found out that simply arranging a plurality of light sources along a width direction is not enough to reliably measure the surface of the object to be measured.

The present invention has been made in consideration of such problems as above, and an object thereof is to provide a surface measurement apparatus and a surface measurement method that are capable of reliably measuring the surface of an object to be measured having a wide width.

Means for Solving the Problems

As a result of earnest studies conducted by the present inventors to solve the above-described problems, they learned that the surface of an object to be measured having a wide width could be measured reliably by appropriately controlling an emission state of a plurality of line beams, which led to the completion of the present invention.

The gist of the present invention completed based on the above-described findings is as follows.

(1) A surface measurement apparatus that measures a surface of an object to be measured moving in a predetermined moving direction on a plane or a surface of an object to be measured moving in a predetermined moving direction along a curved surface of a roll, the surface being along the curved surface, the apparatus includes: N (N being an integer of two or more) light sources provided in a width direction, the light sources each emitting line beam over the width direction, which is a direction perpendicular to the moving direction; a screen on which reflected images of N pieces of the line beam reflected on reflection regions of the surface of the object to be measured respectively are projected; an image capturing device that captures the reflected image projected on the screen and acquires a captured image; and an arithmetic processing device that measures the surface of the object to be measured by using the captured image, in which the reflected images are projected on the screen to be distinguishable from each other.

(2) The surface measurement apparatus according to (1), in which the N light sources are arranged so as to make each moving direction projected reflection region in which the reflection region on the surface of the object to be measured is projected in the moving direction of the object to be measured overlap an adjacent moving direction projected reflection region in the width direction of the object to be measured.

(3) The surface measurement apparatus according to (1) or (2), in which the N light sources are arranged so as to prevent the reflected images from overlapping each other on the screen.

(4) The surface measurement apparatus according to any one of (1) to (3), in which the N light sources are arranged so as to make at least incident angles of the line beams adjacent in the width direction on the surface of the object to be measured or positions of the reflection regions on the surface of the object to be measured in the moving direction different.

(5) The surface measurement apparatus according to (1) or (2), in which emission timings of the line beams of the N light sources and image capturing timings are controlled so as to prevent the reflected images from overlapping each other on the screen when capturing the reflected images.

(6) The surface measurement apparatus according to (1) or (2), in which wavelengths of the line beams that form the reflected images overlapping each other on the screen are different from each other.

(7) A surface measurement method that measures a surface of an object to be measured moving in a predetermined moving direction on a plane or a surface of an object to be measured moving in a predetermined moving direction along a curved surface of a roll, the surface being along the curved surface, the method includes: from N (N being an integer of two or more) light sources provided in a width direction, which is a direction perpendicular to the moving direction, emitting each line beam over the width direction; projecting reflected images of N pieces of the line beam reflected on reflection regions of the surface of the object to be measured respectively on a screen; capturing the reflected image projected on the screen and acquiring a captured image; and measuring the surface of the object to be measured by using the captured image, in which the reflected images are projected on the screen to be distinguishable from each other.

(8) The surface measurement method according to (7), in which the N light sources are arranged so as to make each moving direction projected reflection region in which the reflection region on the surface of the object to be measured is projected in the moving direction of the object to be measured overlap an adjacent moving direction projected reflection region in the width direction of the object to be measured.

(9) The surface measurement method according to (7) or (8), in which the N light sources are arranged so as to prevent the reflected images from overlapping each other on the screen.

(10) The surface measurement method according to any one of (7) to (9), in which the N light sources are arranged so as to make at least incident angles of the line beams adjacent in the width direction on the surface of the object to be measured or positions of the reflection regions on the surface of the object to be measured in the moving direction different.

(11) The surface measurement apparatus according to (7) or (8), in which emission timings of the line beams of the N light sources and image capturing timings are controlled so as to prevent the reflected images from overlapping each other on the screen when capturing the reflected images.

(12) The surface measurement apparatus according to (7) or (8), in which wavelengths of the line beams that form the reflected images overlapping each other on the screen are different from each other.

Effect of the Invention

As explained above, according to the present invention, when measuring the surface of an object to be measured having a wide width, it is possible to prevent the generation of an unmeasurable region caused by overlapping of reflected images projected on a screen. Further, the region that is unmeasured because the object to be measured is not irradiated with light is not generated, thus making it possible to prevent the measurement omission of the object to be measured. Accordingly, it is possible to provide a surface measurement apparatus and a surface measurement method that are capable of reliably measuring the surface of the object to be measured having a wide width.

MODE FOR CARRYING OUT THE INVENTION

Figure 1:
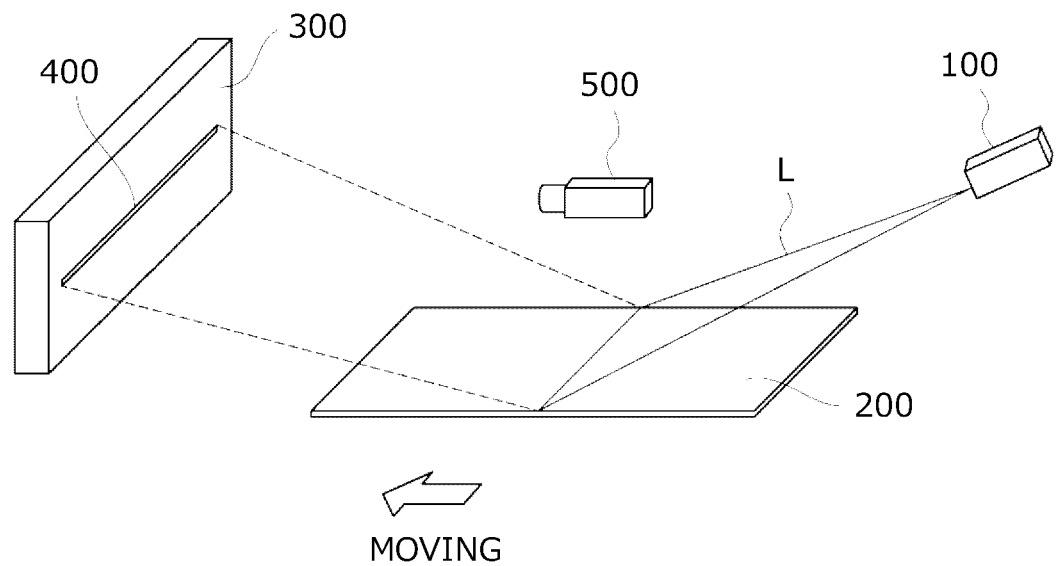
FIG. 1 is a perspective view for explaining a surface measurement method studied by the present inventor.

Hereinafter, preferred embodiments of the present invention will be explained in detail with reference to the attached drawings. In this description and the drawings, components having substantially the same functional configuration are denoted by the same reference numerals and symbols, and thus repeated explanation of these is omitted.

(Studies of a Surface Measurement Method Based on an Optical Lever)

Hereinafter, the results of studies conducted by the present inventor are first explained with reference to FIG. 1 to FIG. 3.

As illustrated in FIG. 1, in a surface measurement method based on an optical lever, line beam L emitted from a light source 100 is reflected on a surface of a moving object to be measured 200. Further, in the surface measurement method, a reflected image 400 of the line beam L reflected on the object to be measured 200 is projected on a screen 300 arranged to face the light source 100. Then, an image capturing device 500 captures the reflected image 400 projected on the screen 300 and analyzes the reflected image 400 in an obtained captured image, and thereby the surface of the object to be measured 200 is measured.

In recent years, there has been a demand for measuring the surface of an object to be measured having a wide width by using such a surface measurement method. However, only the single light source 100 fails to emit line beam with a wide irradiation width at a sufficient power density due to limitations of an optical system or light output. Therefore, there is a problem that it is impossible to easily handle the measurement of an object to be measured having a wide width. Thus, it is conceivable to use a plurality of light sources to increase a substantial irradiation width of the line beam.

Here, if an light section method, which is a general surface measurement method, is used unlike the surface measurement method based on an optical lever, a plurality of light sources only need to be arranged so as to form a single line of a plurality of slit lights along a measurement line in the width direction of the object to be measured, resulting in that the arrangement of the light sources can be easily determined. This is because the light section method is a method in which a slit light is emitted to the object to be measured and the reflected light on the surface of the object to be measured is directly measured.

Figure 2:
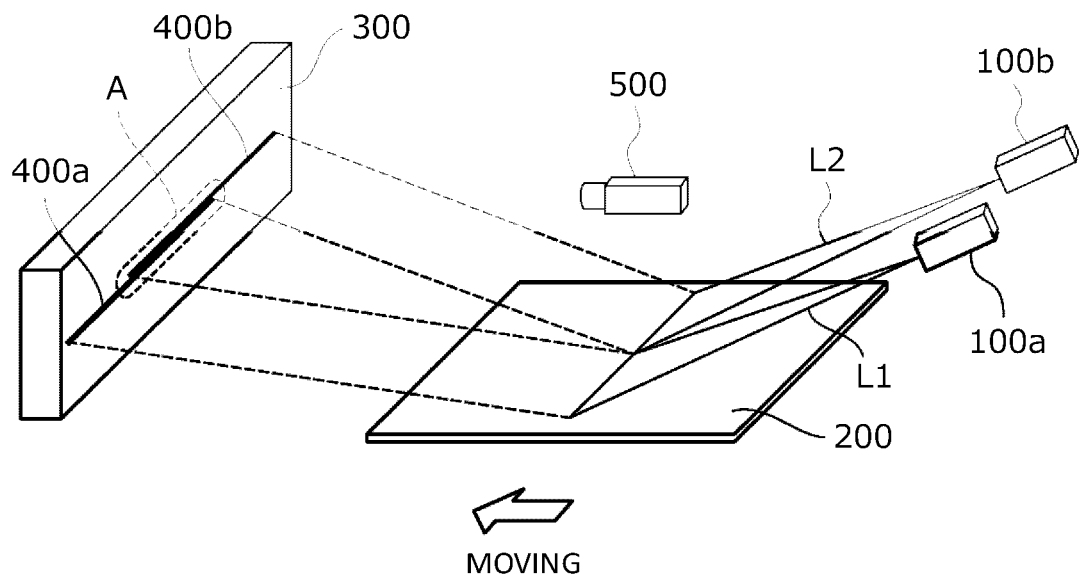
FIG. 2 is a perspective view for explaining the problem of the surface measurement method in FIG. 1.

On the other hand, also in the surface measurement method based on an optical lever, there is conceived a method in which a first light source 100a and a second light source 100b emit first line beam L1 and second line beam L2 to the object to be measured 200 in the width direction respectively so as to form a continuous single line as illustrated in FIG. 2. At this time, the first line beam L1 and the second line beam L2 reflected on the object to be measured 200 each spread out in a fan shape toward a screen 300, so that a first reflected image 400a and a second reflected image 400b projected on the screen 300 partially overlap.

As above, in the surface measurement method based on an optical lever, unlike the light section method, the line beam L is reflected on the object to be measured 200, and a reflected image 400 projected on the screen 300 is captured and measured (FIG. 1). Therefore, as illustrated in FIG. 2, in a region A where the first reflected image 400a and the second reflected image 400b overlap, accurate surface measurement of the object to be measured 200 is no longer possible.

Figure 3:
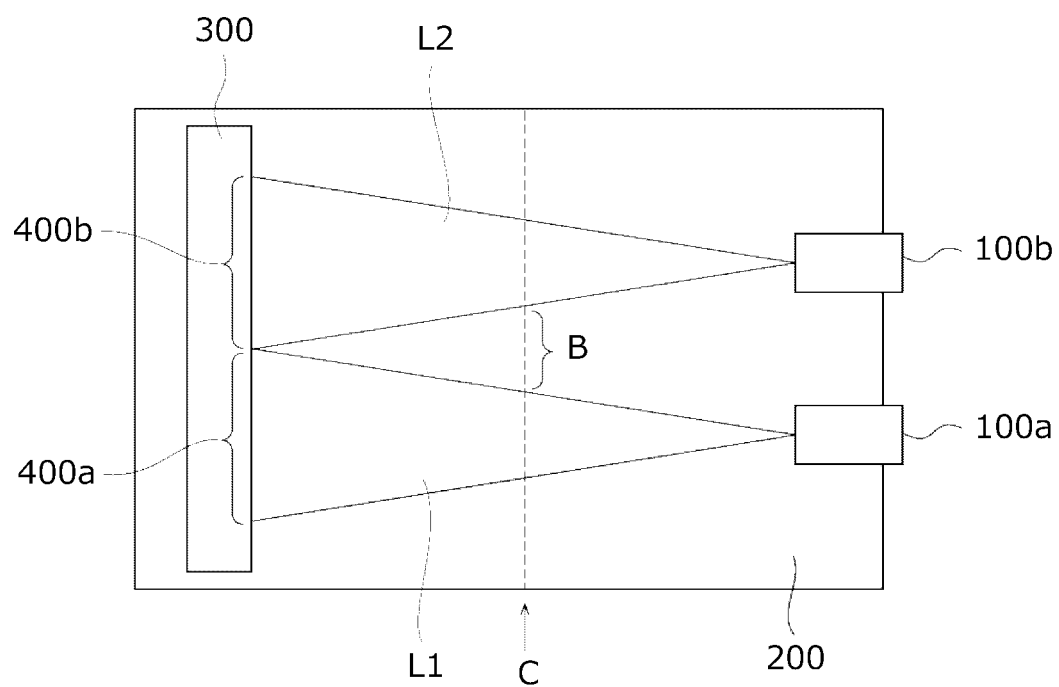
FIG. 3 is a plan view for explaining the problem of the surface measurement method in FIG. 1.

Further, contrary to FIG. 2, as illustrated in FIG. 3, it is also conceivable that the first light source 100a and the second light source 100b emit the first line beam L1 and the second line beam L2 to the object to be measured 200 in the width direction respectively so as to make the first reflected image 400a and the second reflected image 400b connected in a straight line on the screen 300 without overlapping in the width direction of the object to be measured 200. In this case, however, in the object to be measured 200, a region B that is not irradiated with the first line beam L1 or the second line beam L2 is created at a width direction position C where the first line beam L1 and the second line beam L2 reflect. The surface of the region B of the object to be measured 200 that is not irradiated with the light is not measured, thus causing measurement omission.

A surface measurement apparatus and a surface measurement method according to each of embodiments to be explained below can solve the problem of not being able to perform accurate surface measurement due to overlapping of the first reflected image 400a and the second reflected image 400b on the screen 300, and the problem of causing measurement omission in the width direction of the object to be measured 200.

(Outlines of the Surface Measurement Apparatus and the Surface Measurement Method)

Hereinafter, there will be first explained in outline a surface measurement apparatus and a surface measurement method in an embodiment of the present invention.

The surface measurement apparatus in the embodiment of the present invention is to measure a surface of an object to be measured moving in a predetermined moving direction on a plane, or a surface of an object to be measured moving in a predetermined moving direction along a curved surface of a roll, the surface being along the curved surface, and includes: N (N being an integer of two or more) light sources provided in a width direction, the light sources each emitting line beam over the width direction, which is a direction perpendicular to the moving direction of the object to be measured; a screen on which reflected images of N pieces of the line beam reflected on reflection regions of the surface of the object to be measured respectively are projected; an image capturing device that captures the reflected image projected on the screen and acquires a captured image; and an arithmetic processing device that measures the surface of the object to be measured using the captured image. Further, the surface measurement apparatus according to the embodiment of the present invention is configured so that the reflected images are projected on the screen to be distinguishable from each other.

The following first embodiment and second embodiment explain the case where respective reflected images are distinguishable in terms of the position where the reflected image is projected on the screen.

Further, the following third embodiment explains the case where respective line beams emitted from the N light sources are distinguishable in terms of the timing of emitting the line beam to the surface of the object to be measured, and respective reflected images are distinguishable in terms of the timing of projecting the reflected image on the screen.

Further, the following fourth embodiment explains the case where respective line beams emitted from the N light sources and reflected images projected on the screen are distinguishable in terms of wavelength.

The surface measurement apparatus in each of the embodiments of the present invention to be explained in detail below includes N (N being an integer of two or more) light sources provided in the width direction of the object to be measured, which emit N pieces of line beam. At this time, the line beam emitted from a first light source 11, which is any one of the N light sources, is referred to as first line beam, and the line beam emitted from a second light source 12, which is one of the other light sources, is referred to as second line beam. Incidentally, each of the embodiments includes not only the case where the above-described N light sources are provided in the width direction of the object to be measured so as to make separation distances between the respective light sources and the screen in the moving direction of the object to be measured fixed, but also the case where the above-described N light sources are provided in the width direction of the object to be measured so as to make the separation distances between the above-described light sources and the screen different among the N light sources.

Incidentally, the upper limit of the number of light sources in the surface measurement apparatus (in other words, the maximum value of N) is not prescribed in particular, but can be set appropriately according to the width of the object to be measured of interest. Further, in each of the following embodiments, the case where a single image capturing device is present in the surface measurement apparatus will be explained as an example, but, the number of image capturing devices in the surface measurement apparatus is also not prescribed in particular, and can be set appropriately according to the width of the object to be measured of interest.

In each of the embodiments of the present invention to be explained in detail below, the state where the line beam emitted from the first light source is reflected on the surface of the object to be measured and the reflected image is projected on the screen will be described as follows: "the first line beam emitted from the first light source is reflected on a first reflection region of the surface of the object to be measured, and the first reflected image is projected on a first projection region of the screen."

Further, the direction in which the object to be measured moves relative to the surface measurement apparatus is defined as a moving direction MD, and the direction perpendicular to the moving direction MD on the surface of the object to be measured is defined as a width direction WD. Further, the direction parallel to the width direction WD on a projection plane of the screen is defined as an x direction, and the direction perpendicular to the width direction WD on the projection plane of the screen is defined as a z direction.

First Embodiment

The first embodiment of the present invention to be explained in detail below explains a surface measurement apparatus in the case where N light sources are arranged so as to prevent reflected images from overlapping each other on the screen, and the object to be measured is moving on a plane in a predetermined moving direction. Here, the term "plane" above includes not only planes in a narrow sense of the word, but also planes having irregularities that can be regarded as a plane, such as a transport plane of a transport line, for example.

Figure 4A:
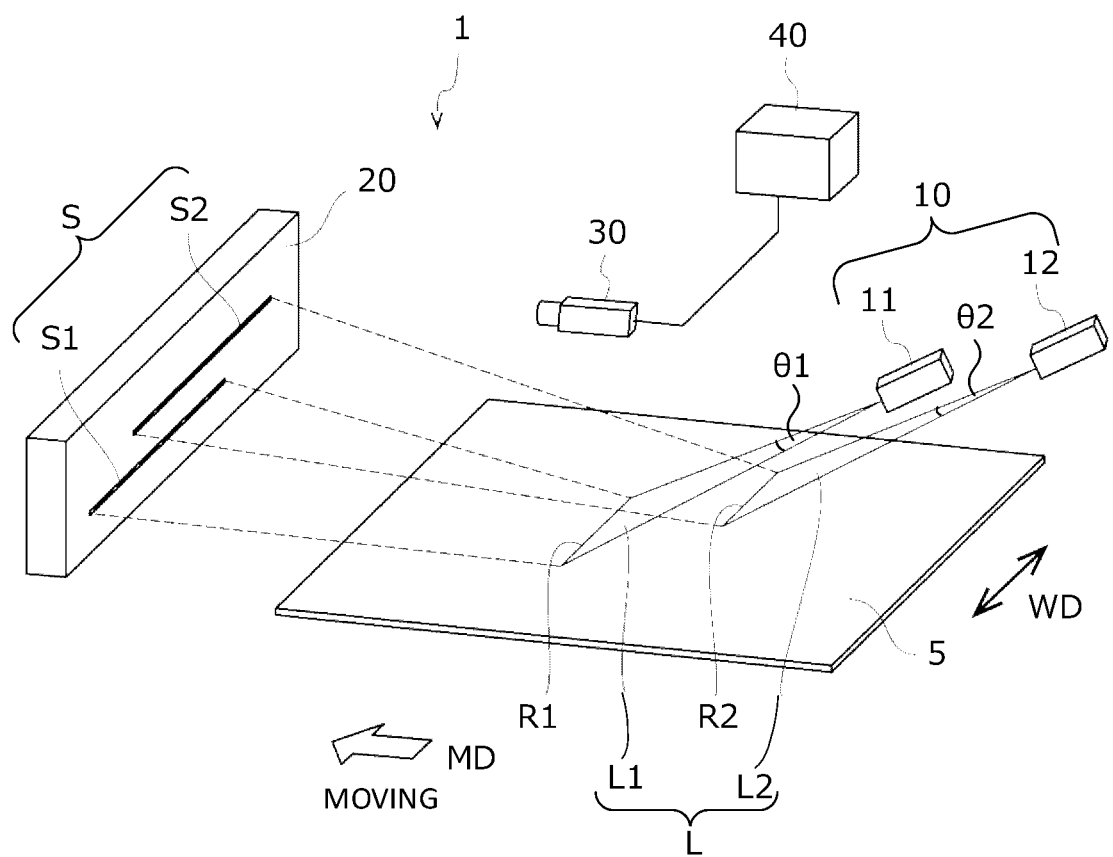
FIG. 4A is a perspective view schematically illustrating a surface measurement apparatus in a first embodiment.
Figure 4B:
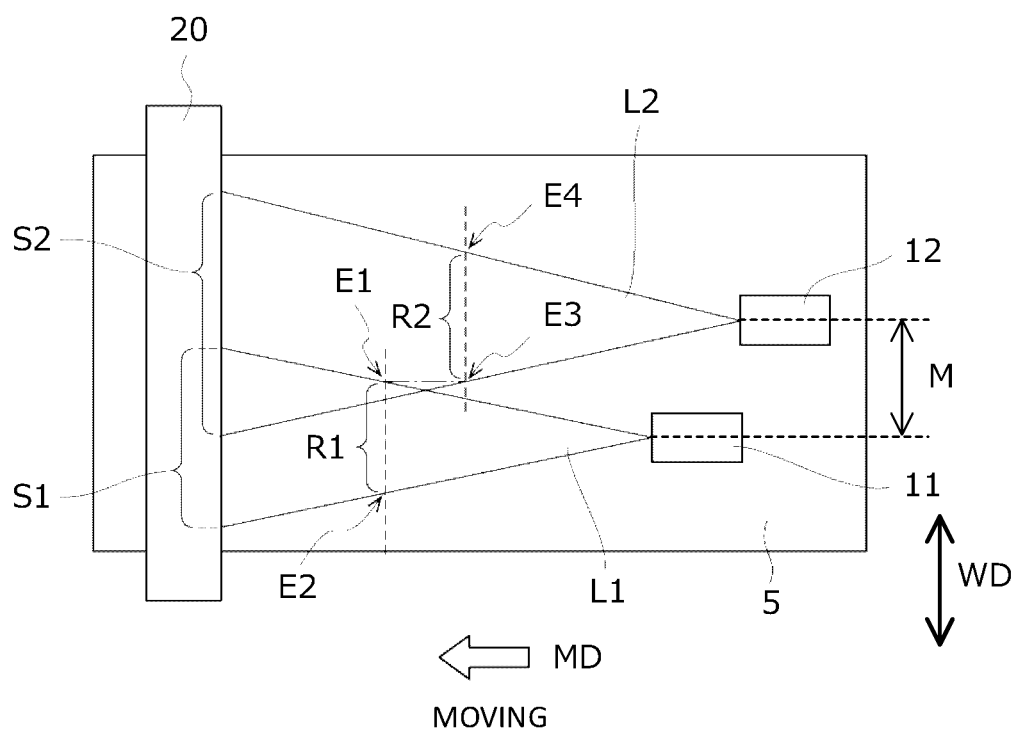
FIG. 4B is a plan view of FIG. 4A viewed from above.
Figure 4C:
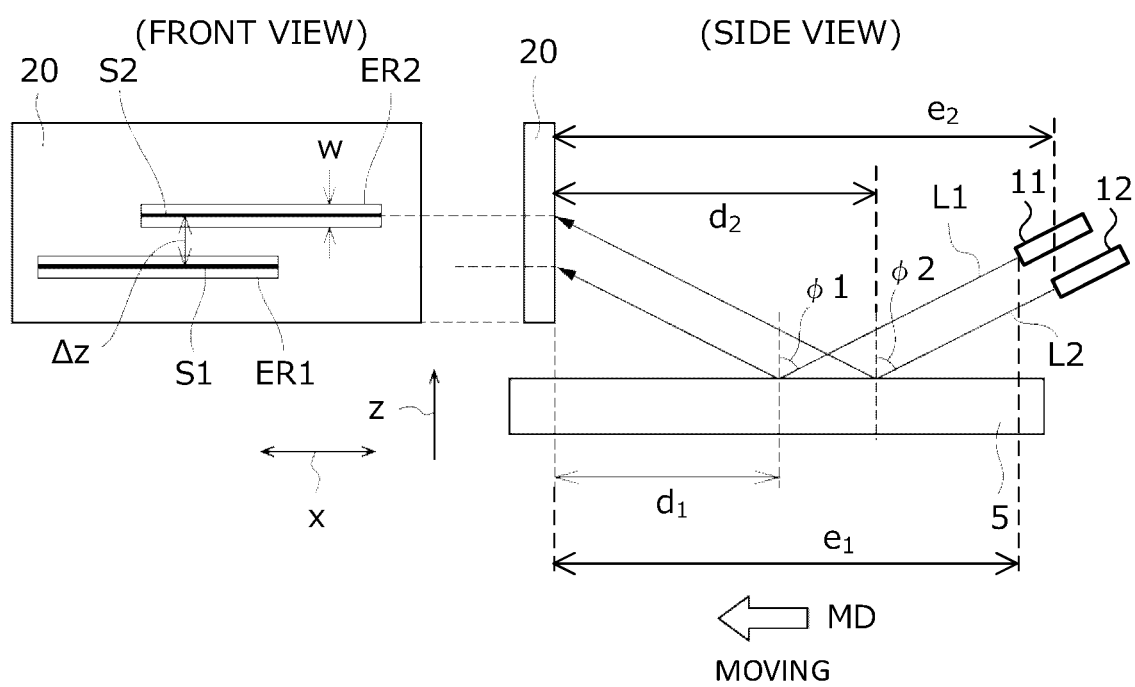
FIG. 4C is a side view of the surface measurement apparatus illustrated in FIG. 4A and a front view of a screen.
Figure 5:
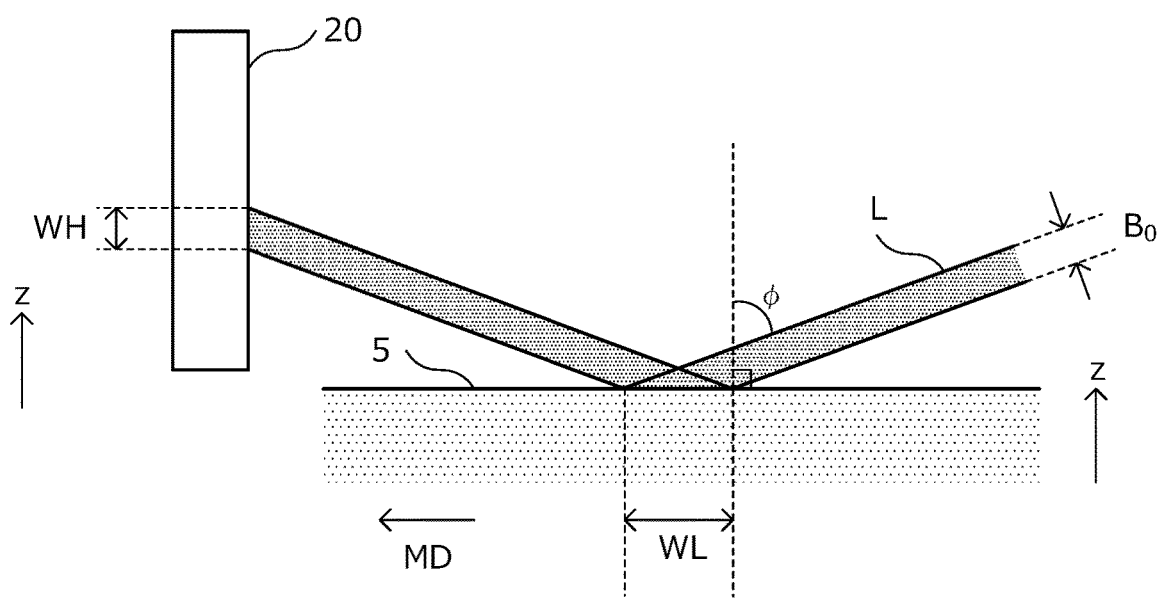
FIG. 5 is a schematic view for explaining the relationship between a width of line beam emitted from a light source and a width of a reflected image that is reflected on a plane to be projected on the screen.

FIG. 4A to FIG. 4C are views each schematically illustrating a surface measurement apparatus 1 in the first embodiment of the present invention. FIG. 5 is a schematic view for explaining the relationship between a width of line beam emitted from a light source and a width of a reflected image that is reflected on a plane to be projected on the screen. In the first embodiment, an aspect in which the object to be measured 5 moves on a plane is explained as an example.

As illustrated in FIG. 4A, the surface measurement apparatus 1 in the first embodiment of the present invention includes: N light sources 10 (in FIG. 4A, only a first light source 11, which is any one of the N light sources 10, and a second light source 12, which is one of the other N light sources 10, are illustrated, and the other light sources are not illustrated); a screen 20; an image capturing device 30; and an arithmetic processing device 40. The light source 10 emits line beam L to a surface of a strip-shaped object to be measured 5 moving on a plane of a transport line from the upstream side of the object to be measured 5 in the moving direction MD.

The light sources 10 desirably have the same configuration, and have a configuration in which, for example, a light source part such as a CW (Continuous Wave) laser light source, SLD (Super Luminescent Diode) light source or LED (Light Emitting Diode) light source with continuous oscillation, and a lens part such as a rod lens are combined. The light source 10 spreads the light emitted from the light source part into a fan-shaped plane by the lens part and emits it toward the surface of the object to be measured 5.

The light source 10 emits the line beam L that spreads along the width direction WD and has a narrow width in the moving direction MD. Incidentally, in the present invention, the light source 10 may be any as long as the emitted light spreads in a fan shape, in which, for example, a lens such as a cylindrical lens or a Powell lens other than the rod lens can also be used for the lens part.

The screen 20 is provided at a position facing the light source 10, on which reflected light S of the line beam L reflected on the surface of the object to be measured 5 is projected. The screen 20 has a width wide enough to enable projection of N pieces of the reflected light S, which is the full width of the object to be measured 5, for example. Further, the height of the screen 20 is selected to be the height at which projection positions (namely, projection regions) of N pieces of the reflected light S, which vary according to the shape of the object to be measured 5, vibrations to be generated by the movement of the object to be measured 5, the thickness of the object to be measured 5, or the like, exist on the screen 20. The object to be measured 5 is not particularly limited, but is, for example, a strip-shaped body, and examples of such a strip-shaped body include a strip-shaped metal plate, and so on.

The image capturing device 30 is an area camera having an image sensor such as a CCD (Charge Coupled Device) sensor or a CMOS (Complementary Metal Oxide Semiconductor) sensor, for example, and is provided at a position facing the screen 20. The image capturing device 30 captures a first reflected image S1 and a second reflected image S2 created by the first reflected light and the second reflected light being projected on the screen 20, respectively, and acquires a captured image where these first reflected image S1 and second reflected image S2 are captured.

Here, the image capturing device 30 is controlled by the arithmetic processing device 40, and receives a trigger signal for image capturing from the arithmetic processing device 40 every time the object to be measured 5 moves by a predetermined distance in the moving direction MD. In response to the trigger signal output from the arithmetic processing device 40, the image capturing device 30 sequentially captures an image of a projection plane of the screen 20 on which the reflected image S is projected, and outputs the acquired captured image to the arithmetic processing device 40.

FIG. 4B is a plan view of the surface measurement apparatus 1 in FIG. 4A viewed from above. Further, on the right in FIG. 4C, the side view of the surface measurement apparatus 1 in FIG. 4A is illustrated, and on the left in FIG. 4C, the front view of the screen 20 is illustrated. FIG. 4B is a view focusing on the first line beam L1 and the second line beam L2, where the image capturing device 30 and the arithmetic processing device 40 are omitted. As illustrated in FIG. 4A and FIG. 4B, in the surface measurement apparatus 1 in the first embodiment, the first light source 11 and the second light source 12, which are arranged above the object to be measured 5 moving on a plane, are arranged at positions separated by a distance M in the width direction WD.

As illustrated in FIG. 4A to FIG. 4C, the first light source 11 emits the first line beam L1 with an opening angle $\theta 1$ from a position at a distance e1 from the screen 20 in the moving direction MD of the object to be measured 5 to a position at a distance d1 from the screen 20 in the moving direction MD of the object to be measured 5. This creates a reflection region R1 on the surface of the object to be measured 5. Further, the second light source 12 emits the second line beam L2 with an opening angle $\theta 2$ from a position at a distance e2 from the screen 20 in the moving direction MD of the object to be measured 5 to a position at a distance d2 from the screen 20 in the moving direction MD of the object to be measured 5. This creates a reflection region R2 on the surface of the object to be measured 5.

The first line beam L1 is reflected on the first reflection region R1 of the object to be measured 5, and thereby the strip-shaped first reflected image S1 is projected on the first projection region of the screen 20. Similarly, the second line beam L2 is reflected on the second reflection region R2 of the object to be measured 5, and thereby the strip-shaped second reflected image S2 is projected on the second projection region of the screen 20.

As illustrated in FIG. 4C, an incident angle of the first line beam L1 on the object to be measured 5 is set to an angle of ϕ1, and an incident angle of the second line beam L2 on the object to be measured 5 is set to an angle of ϕ2. Here, the incident angle is an angle between a normal of the surface of the object to be measured 5 and an optical axis of the first line beam L1 (second line beam L2). Further, as schematically illustrated in FIG. 5, a beam diameter of the line beam L emitted from each of the light sources is denoted as $B_0$, and a line width of the line beam in the moving direction MD on the surface of the object to be measured 5 is denoted as WL.

Here, as schematically illustrated in FIG. 4C, the ranges in which the first reflected image S1 and the second reflected image S2 may vary in position on the screen 20 due to the shape of the object to be measured 5 or other reasons to be projected on the screen 20 are defined as a variation range ER1 and a variation range ER2, respectively. In FIG. 4C, w is the width (length) in the z direction of the variation range, which indicates a variation width in the z direction of each of the first reflected image S1 and the second reflected image S2. w, which is the variation width of the variation range ER1, can include a line width (thickness) WH of the first reflected image S1 in the z direction on the screen 20 as illustrated in FIG. 5, in addition to the variation region of the first reflected image S1 created in the z direction on the screen 20 due to the shape change or vibrations assumed in the object to be measured 5. Similarly, w, which is the variation width of the variation range ER2, can include a line width (thickness) WH of the second reflected image S2 in the z direction on the screen 20, in addition to the variation region of the second reflected image S2 created in the z direction on the screen 20 due to the shape change or vibrations assumed in the object to be measured 5. Incidentally, the line width WH of the reflected image is larger than a width B of the line beam emitted from the light source.

Incidentally, as the first reflected image S1 and the second reflected image, the reflected lights of the line beams emitted from the first light source 11 and the second light source 12 on the surface of the object to be measured 5 are to be projected on the screen at different magnifications. Therefore, the width of the first reflected image S1 in the z direction of the variation range ER1 and the width of the second reflected image S2 in the z direction of the variation range ER2 should be strictly different values. However, the difference in width between the above-described variation ranges can be regarded as small, and thus, the widths of the variation ranges are explained here as the same w. On the other hand, it is also possible to regard the widths of such variation ranges as different values as appropriate. In that case, the value with a larger variation width is preferably set as w.

Here, unless the first reflected image and the second reflected image overlap in the z direction, the first reflected image and the second reflected image are distinguishable from each other without overlapping each other on the screen regardless of where the first reflected image and the second reflected image are located in the x direction. Here, "not overlapping in the z direction" means that a distance Δz in the z direction on the screen between the middle of the line width of the first reflected image and the middle of the line width of the second reflected image is larger by the variation width w or more, and means that the following expression (1) is satisfied.

[Mathematical expression 1]

$$\Delta z > w \qquad \text{Expression (1)}$$

Incidentally, based on the geometric positional relationship, the above Δz can be expressed as the following equation (2).

[Mathematical equation 2]

$$\Delta z = \left| \frac{d1}{\tan\phi 1} - \frac{d2}{\tan\phi 2} \right| \qquad \text{Equation (2)}$$

On the other hand, even if the first reflected image and the second reflected image overlap in the z direction on the screen, the first reflected image and the second reflected image are distinguishable from each other without overlapping each other on the screen unless the first reflected image and the second reflected image overlap in the width direction WD. In order to satisfy this condition, the condition described in the following expression (3) only needs to be satisfied.

[Mathematical expression 3]

$$\frac{\tan\frac{\theta_1}{2}}{\sin\phi 1}e1 + \frac{\tan\frac{\theta_2}{2}}{\sin\phi 2}e2 < M \qquad \text{Expression (3)}$$

That is, as long as each of the N light sources 10 satisfies the expression 1 or the expression 3, the N reflected images do not overlap each other on the screen 20 to be distinguishable from each other.

In this embodiment, there is no particular limitation on the incident angle ϕ1 of the first line beam L1 on the object to be measured 5 or the incident angle ϕ2 of the second line beam L2 on the object to be measured 5, but, for example, with the incident angles made the same as each other, they only need to be displaced from each other in the moving direction MD of the object to be measured 5 so as to make the position d1 of the first reflection region R1 and the position d2 of the second reflection region R2 on the surface of the object to be measured 5 different.

Here, the incident angles being the same includes not only the case where ϕ1=ϕ2 is established, but also the case where the incident angles have an angular difference within a range where the position of the first reflected image S1 and the position of the second reflected image S2 look the same as each other according to the resolution of the image capturing device 30 when a plane having no irregularities is measured while using the first light source 11 and the second light source 12.

As a result, as long as the expression (1) or the expression (3) is satisfied, the first reflected image S1 and the second reflected image S2 can be projected on the screen 20 in a separated state without overlapping each other. Therefore, in the captured image acquired by the image capturing device 30, the first reflected image S1 and the second reflected image S2 are captured in a separated state in the z direction on the screen 20 without overlapping each other.

Further, under the condition that the N light sources each satisfy the expression (1) or the expression (3), the N light sources may be arranged so that the reflection regions irradiated with the line beams emitted from the N light sources are arranged in a staggered pattern where the reflection regions are alternately different in the moving direction along the width direction. Such a staggered arrangement is useful when the range in the moving direction that can be secured as the reflection region is limited. Incidentally, the above-described staggered arrangement is not limited to an arrangement of two rows, but also includes an arrangement of multiple rows.

On the other hand, with the position d1 of the first reflection region R1 and the position d2 of the second reflection region R2 on the surface of the object to be measured 5 made the same, the incident angle φ1 of the first line beam L1 on the object to be measured 5 and the incident angle φ2 of the second line beam L2 on the object to be measured 5 may be made different. Such a configuration is useful when the range in the moving direction that can be secured as the reflection region is extremely limited.

Here, the positions being the same includes not only the case where d1=d2 is established, but also the case where the positions have a positional displacement within a range where the position of the first reflected image S1 and the position of the second reflected image S2 look the same as each other according to the resolution of the image capturing device 30 when a plane having no irregularities is measured while using the first light source 11 and the second light source 12.

As a result, as long as the condition illustrated in the expression (1) is satisfied, the first reflected image S1 and the second reflected image S2 can be projected on the screen 20 in a separated state in the z direction without overlapping each other. Therefore, in the captured image acquired by the image capturing device 30, the first reflected image S1 and the second reflected image S2 are captured in a separated state in the z direction on the screen 20 without overlapping each other.

Further, under the condition that the N light sources each satisfy the above-described expression (1) or the expression (3), the positions in the moving direction MD of the reflection regions irradiated with the line beams from the N light sources may be made the same and the N light sources may be arranged to make the incident angles on the object to be measured 5 different alternately in the moving direction along the width direction. Such a configuration is useful when, in addition to the reflection region, the position range where the light source is arranged is limited in the moving direction.

The arithmetic processing device 40 in this embodiment can measure changes in shape due to irregularities of the surface or other reasons, surface roughness, and so on as the measurement of the surface of the object to be measured 5 based on the captured image acquired by the image capturing device 30.

The arithmetic processing device 40 measures the surface shape of the object to be measured 5 as follows, for example. If there is an inclined surface at the position of the surface of the object to be measured 5 that is irradiated with the line beam L, the reflection direction of the line beam L changes according to an inclined angle of the inclined surface. The change in the reflection direction appears as an amount of displacement of the line beam L from a reference position. Therefore, according to the principle of an optical lever, the reflected image S moves up and down on the screen 20 in accordance with the amount of displacement.

The arithmetic processing device 40 detects the surface change by detecting the position of the reflected image S on the screen from the captured image acquired by capturing images on the screen 20.

Incidentally, the more detailed configuration of the arithmetic processing device 40 will be explained again below.

Next, the configuration of the arithmetic processing device 40 in the first embodiment is explained in detail with reference to FIG. 6.

Figure 6:
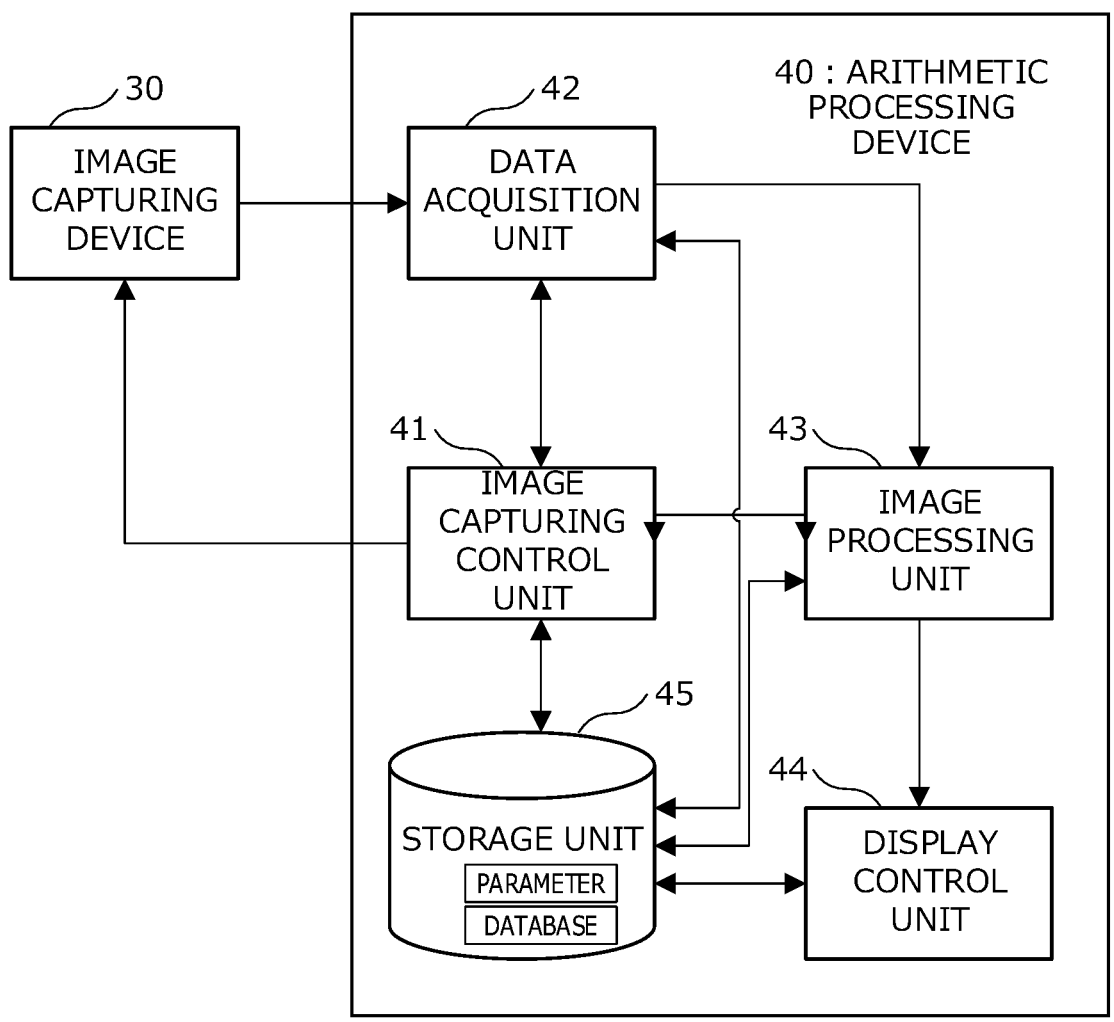
FIG. 6 is a block diagram illustrating one example of a configuration of an arithmetic processing device included in the surface measurement apparatus in the first embodiment.

The arithmetic processing device 40 in the first embodiment includes an image capturing control unit 41, a data acquisition unit 42, an image processing unit 43, a display control unit 44, and a storage unit 45 mainly as illustrated in FIG. 6.

The image capturing control unit 41 is fabricated with, for example, a CPU (Central Processing Unit), a ROM (Read Only Memory), a RAM (Random Access Memory), a communication device, and so on. The image capturing control unit 41 controls, in a centralized manner, measurement processing by the surface measurement apparatus 1 in the first embodiment.

Specifically, when the image capturing device 30 starts capturing a reflected image projected on the screen 20, the image capturing control unit 41 transmits a trigger signal for starting image capturing to the image capturing device 30 every time the image capturing control unit 41 acquires a PLG signal transmitted at regular intervals from a driving mechanism or the like that controls conveyance of the object to be measured 5 (for example, a PLG signal output every time the object to be measured 5 moves 1 mm).

The data acquisition unit 42 is fabricated with, for example, a CPU, a ROM, a RAM, a communication device, and so on. The data acquisition unit 42 acquires captured image data output from the image capturing device 30. The data acquisition unit 42 outputs the acquired captured image data to the later-described image processing unit 43.

The image processing unit 43 is fabricated with, for example, a CPU, a ROM, a RAM, a communication device, and so on. The image processing unit 43 acquires the captured image data generated by the image capturing device 30, performs image processing, which will be explained below, on the captured image data, and measures the surface of the object to be measured 5. After finishing the measurement processing of the surface of the object to be measured 5, the image processing unit 43 transmits information on the obtained measurement results to the display control unit 44 and the storage unit 45, and transmits the information to various devices provided outside the surface measurement apparatus 1.

Incidentally, this image processing unit 43 will be explained in detail again below.

The display control unit 44 is fabricated with, for example, a CPU, a ROM, a RAM, an output device, a communication device, and so on. The display control unit 44 performs display control in displaying the measurement results of the object to be measured 5, which are transmitted from the image processing unit 43, on an output device such as a display included in the arithmetic processing device 40, an output device provided outside the arithmetic processing device 40, or the like. Thus, a user of the surface measurement apparatus 1 can recognize on-site various measurement results related to the object to be measured 5.

The storage unit 45 is one example of a storage device included in the arithmetic processing device 40, and is fabricated with, for example, a ROM, a RAM, a storage device, and so on. In the storage unit 45, there is stored information on design parameters of the surface measurement apparatus 1, such as information indicating an optical positional relationship between the light source and the image capturing device included in the surface measurement apparatus 1 and information transmitted from a host computer (such as, for example, a management computer that manages the transport line as a whole) provided outside the surface measurement apparatus 1. In addition, in the storage unit 45, there are appropriately recorded various parameters and processing intermediate progresses that the arithmetic processing device 40 according to this embodiment needs to save when performing some sort of processing (for example, processing results transmitted from the image processing unit 43, various data and databases stored beforehand, programs, and so on). With regard to this storage unit 45, the image capturing control unit 41, the data acquisition unit 42, the image processing unit 43, the display control unit 44, the host computer, and so on can perform data reading/writing processing freely.

Next, the image processing unit 43 included in the arithmetic processing device 40 in the first embodiment is explained in detail with reference to FIG. 7 to FIG. 10.

Figure 7:
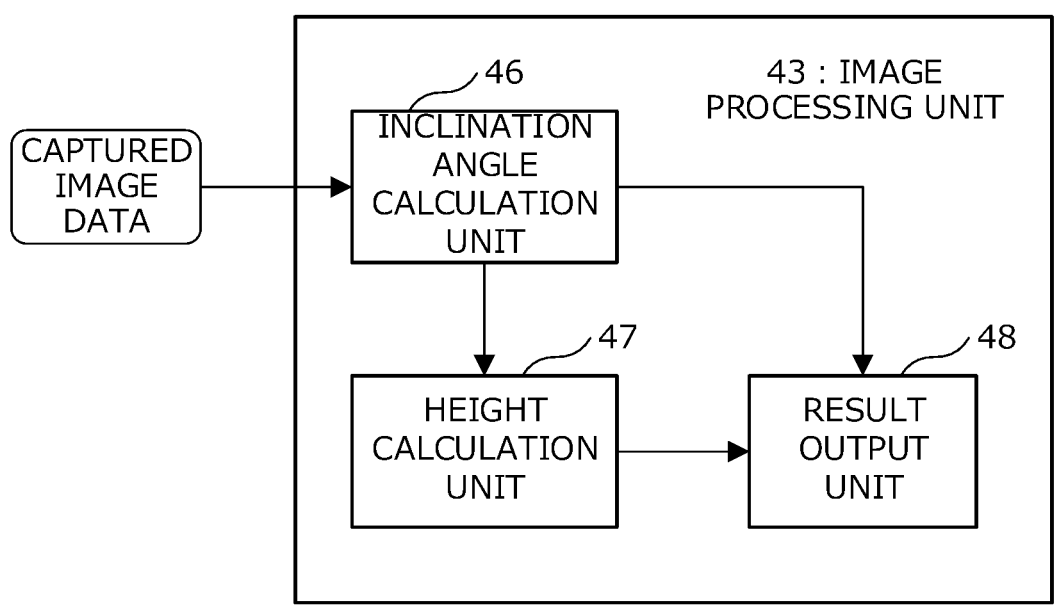
FIG. 7 is a block diagram illustrating one example of a configuration of an image processing unit included in the arithmetic processing device in the first embodiment.

The image processing unit 43 according to this embodiment uses the captured image generated by the image capturing device 30, and performs image processing on the captured image, to thereby calculate various pieces of information on the surface of the object to be measured 5. The image processing unit 43 includes, as illustrated in FIG. 7, an inclination angle calculation unit 46, a height calculation unit 47, and a result output unit 48.

The inclination angle calculation unit 46 is fabricated with, for example, a CPU, a ROM, a RAM, and so on. The inclination angle calculation unit 46 uses the captured image generated by the image capturing device 30 to calculate an inclination angle ω of the surface of the object to be measured 5, as information on the surface of the object to be measured 5. Processing of calculating the inclination angle ω of the surface to be performed by the inclination angle calculation unit 46 is explained in detail below.

The inclination angle calculation unit 46 in this embodiment calculates the inclination angle ω of the surface of the object to be measured 5 based on the degree of bending of a reflected image of line beam in the captured image.

Figure 8:
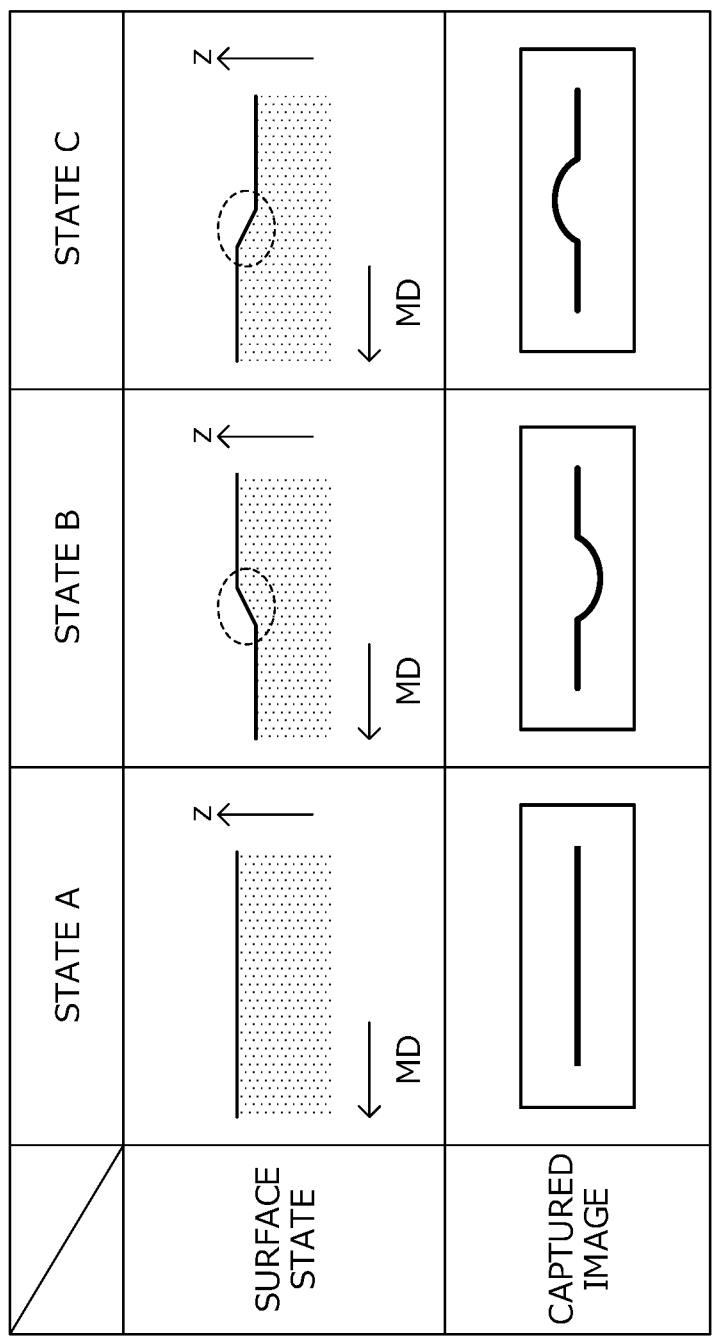
FIG. 8 is an explanatory view schematically illustrating the relationship between a surface state of an object to be measured and a captured image.

As schematically illustrated as a state A in FIG. 8, in the case where the surface of the object to be measured 5 in a portion irradiated with line beam is flat, a reflected image of the line beam in a captured image is substantially straight along the width direction of the screen. Further, as schematically illustrated as a state B in FIG. 8, in the case where the surface of the object to be measured 5 is inclined downward toward the moving direction MD in a portion irradiated with line beam (a region surrounded by a broken line in the drawing), a reflected image of the line beam reflected on this inclined surface is displaced downward in the height direction of the screen from a position (also referred to as "reference position" below) of the reflected image in a flat portion. As a result, as illustrated in the state B in FIG. 8, a straight portion substantially parallel to the width direction of the screen and a downwardly convex portion are mixed in the captured image. In contrast, as schematically illustrated as a state C in FIG. 8, in the case where the surface of the object to be measured 5 is inclined upward toward the moving direction MD in a portion irradiated with line beam (a region surrounded by a broken line in the drawing), a reflected image of the line beam reflected on this inclined surface is displaced upward in the height direction of the screen from a position of the reflected image in a flat portion. As a result, as illustrated in the state C in FIG. 8, a straight portion substantially parallel to the width direction of the screen and an upwardly convex portion are mixed in the captured image.

The amount of displacement of the reflected image from the reference position, which is schematically illustrated in the state B and the state C in FIG. 8, is proportional to the magnitude of the inclination angle ω of the surface of the object to be measured 5. Hence, the inclination angle calculation unit 46 first specifies a position with a maximum value of luminance distribution in the height direction of the screen 20 (z direction) in the captured image by center-of-gravity operation using luminance values, and sets the position as the middle of a line width of the reflected image. Then, the inclination angle calculation unit 46 specifies the change in the middle position of the line width of the reflected image along the width direction WD of the screen 20 in the captured image. Thus, the inclination angle calculation unit 46 can specify, at each coordinate in the width direction WD in the captured image, the difference from the reference position (namely, a z coordinate in a straight portion substantially parallel to the width direction of the screen) (namely, an amount of displacement ΔH from the reference position).

Figure 9:
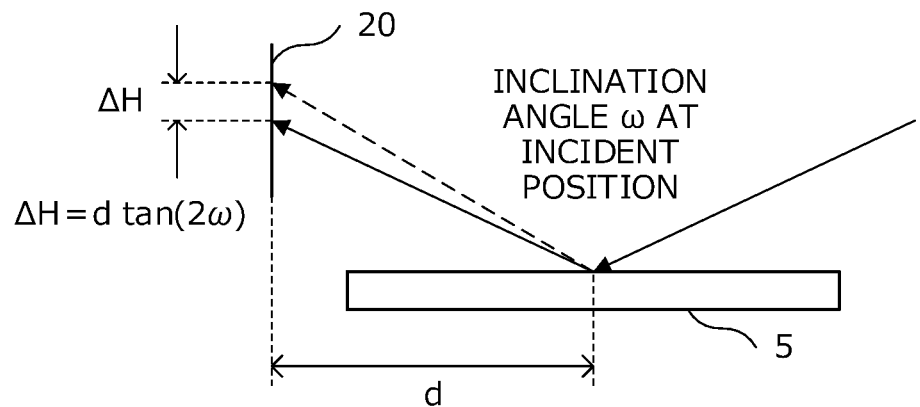
FIG. 9 is an explanatory view schematically illustrating the relationship between an inclination on a surface of the object to be measured and an amount of displacement of the reflected image on a projection plane of the screen.

The displacement of the reflected image in the captured image is caused by a change in surface shape that is larger than the line width WL of the line beam, and the line beam reflected on the surface of the object to be measured 5, where the change in surface shape that is larger than the line width WL of the line beam has occurred, goes up and down on the projection plane of the screen 20 in accordance with a direction and an angle of an inclination of this portion. Here, the relationship between the amount of displacement ΔH of the reflected image from the reference position in the captured image and the inclination angle ω of the surface of the object to be measured 5 is given by ΔH=d·tan 2ω as illustrated in FIG. 9, on the basis of the principle of an optical lever. Incidentally, d is a horizontal distance from an incident point of the line beam on the surface of the object to be measured 5 to the screen 20. Accordingly, the inclination angle ω of the surface of interest can be calculated by performing an operation of ω=(½)×tan$^{-1}$(ΔH/d). On this occasion, since the horizontal distance d can be recognized beforehand as a design parameter of the image capturing device 30, the inclination angle calculation unit 46 can calculate the inclination angle ω using the amount of displacement ΔH from the reference position that is obtained by analyzing the captured image.

By performing the processing explained above, the inclination angle calculation unit 46 can obtain a distribution of the inclination of the surface of the object to be measured 5 in a portion irradiated with line beam. Incidentally, a data group of inclination values obtained in this manner can also be converted into an image by replacing the data group with the high/low or light/dark of luminance values.

The inclination angle calculation unit 46 outputs the data on the inclination angle of the surface of the object to be measured 5 generated as above to the height calculation unit 47. In addition, the inclination angle calculation unit 46 may output the generated data on the inclination angle of the surface of the object to be measured 5 themselves, images, or the like to the result output unit 48.

Figure 10:
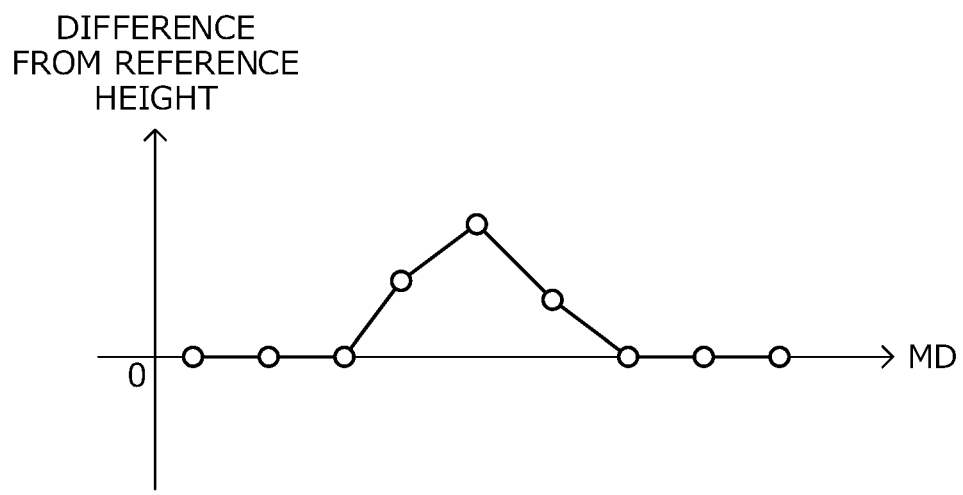
FIG. 10 is an explanatory view for explaining height calculation processing performed in the image processing unit in the first embodiment.

The height calculation unit 47 is fabricated with, for example, a CPU, a ROM, a RAM, and so on. The height calculation unit 47 calculates the height of the surface of the object to be measured of interest as information on the surface of the object to be measured 5 by using the inclination angle of the surface of the object to be measured 5 calculated by the inclination angle calculation unit 46. Specifically, the height calculation unit 47 integrates a tangent tan ω of the inclination angle along the moving direction MD of the object to be measured 5 as illustrated in FIG. 10 by using the inclination angle ω of the surface of the object to be measured 5 calculated by the inclination angle calculation unit 46, thereby calculating the height of the surface of the object to be measured (a difference value from a reference height).

By performing the above-described integration processing on all the elements of the data on the inclination angles of the surface obtained from the captured images, the height calculation unit 47 can obtain a data group on surface heights (in other words, map data on surface heights) for the entire surface of the object to be measured 5. Here, the data group on the surface heights can also be converted into an image by replacing such surface height values with the high/low or light/dark of luminance values.

The height calculation unit 47 outputs the data on the height of the surface of the object to be measured 5 generated as above to the result output unit 48.

The result output unit 48 is fabricated with, for example, a CPU, a ROM, a RAM, an output device, and so on. The result output unit 48 outputs various pieces of information on the surface of the object to be measured 5 generated by the inclination angle calculation unit 46 and the height calculation unit 47, to the display control unit 44. Thereby, various pieces of information on the surface of the object to be measured 5 are output to a display unit (not illustrated), such as a display. Further, the result output unit 48 may output the obtained measurement results of the surface to an external device such as a process computer for production management, and may create various record files related to products by using the obtained measurement results. Moreover, the result output unit 48 may store information on the surface of the object to be measured 5, as history information, in the storage unit 45 or the like, in association with time information on date and time or the like at which the information is calculated.

One example of the function of the arithmetic processing device 40 according to this embodiment has been exampled. Each of the above-described components may be configured with a general-purpose member or circuit, or may be configured with hardware specialized for the function of each component. Further, a CPU or the like may perform all the functions of the respective components. Thus, the configuration to be used can be changed as appropriate, according to the technology level at the time of performing this embodiment.

Note that a computer program for achieving each of the functions of the arithmetic processing device according to this embodiment as above can be created and implemented in a computer or the like. Moreover, a computer-readable recording medium in which this computer program is stored can be provided as well. Examples of the recording medium include a magnetic disk, an optical disk, a magneto-optical disk, a flash memory, and so on. Further, the above-described computer program may be delivered via a network, for example, without using the recording medium.

Figure 11:
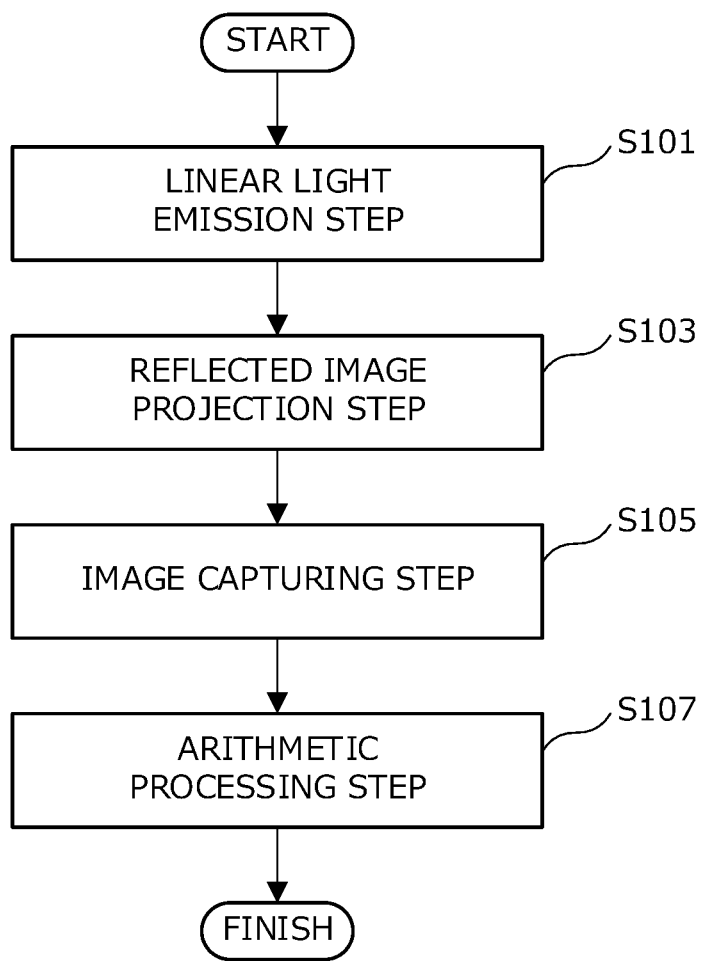
FIG. 11 is a flowchart illustrating one example of a flow of the surface measurement method in the first embodiment.

As illustrated in FIG. 11, in the surface measurement apparatus 1, the N light sources emit line beams (line beam emission step: Step S101). A reflected image is projected on the screen 20 by the line beam being reflected on the reflection region on the surface of the object to be measured 5 (reflected image projection step: Step S103). In the surface measurement apparatus 1, the image capturing device 30 captures the reflected image on the screen 20 (image capturing step: Step S105), and the arithmetic processing device 40 measures the surface of the object to be measured 5 by using the obtained captured image (arithmetic processing step: Step S107).

Function and Effect of the First Embodiment

As above, in the surface measurement apparatus 1, the reflected images of the line beams emitted from the N light sources are projected on the screen 20 so as not to overlap each other. Therefore, it is possible to prevent the generation of an unmeasurable region caused by overlapping of the reflected images projected on the screen 20 even if the N light sources are arranged to measure the surface of the object to be measured 5 having a wide width.

Figure 12:
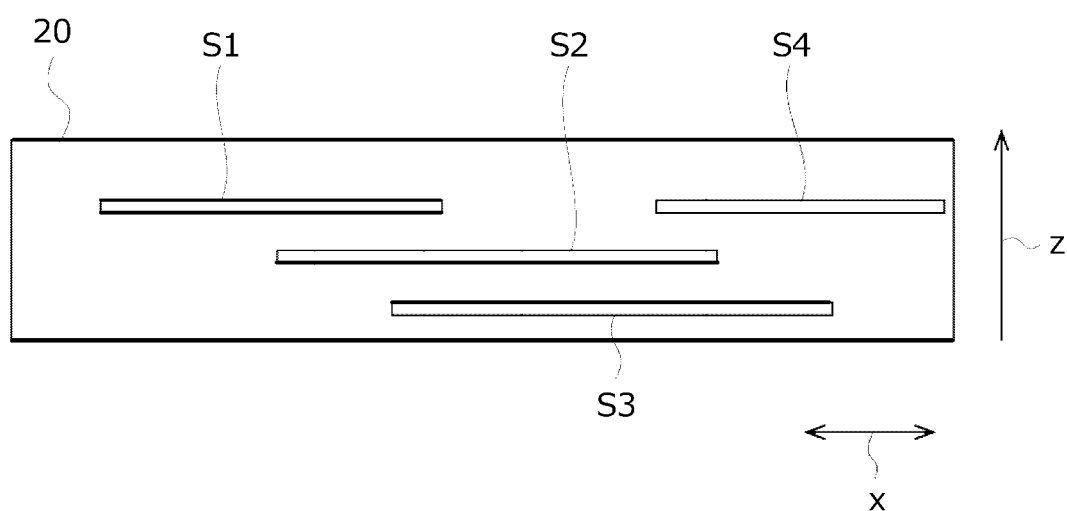
FIG. 12 is a front view of the screen illustrating a first reflected image, a second reflected image, a third reflected image, and a fourth reflected image projected on the screen of the surface measurement apparatus in the first embodiment.

Here, there is explained an example where, in such a first embodiment as illustrated in FIG. 4A, four light sources are installed and four reflected images S1, S2, S3, and S4 are projected on the screen 20 below while using FIG. 12. FIG. 12 illustrates a front view of the screen 20.

Even in the case illustrated in FIG. 12, one of the two conditions described above is established.

In other words, as illustrated in FIG. 12, on the screen 20, the reflected image S1, the reflected image S2, and the reflected image S3 do not overlap each other along the z direction of the screen 20. Similarly, the reflected image S2, the reflected image S3, and the reflected image S4 do not overlap each other. This is because the relationship in the expression (1) is satisfied.

Further, on the screen 20, the reflected image S1 and the reflected image S4 overlap in the z direction, but do not overlap in the width direction. This is because the relationship in the expression (3) is satisfied.

Second Embodiment

The second embodiment of the present invention, which will be explained in detail below, explains a surface measurement apparatus in the case where the object to be measured 5 moves while being wound around a roll or the like.

Figure 13A:
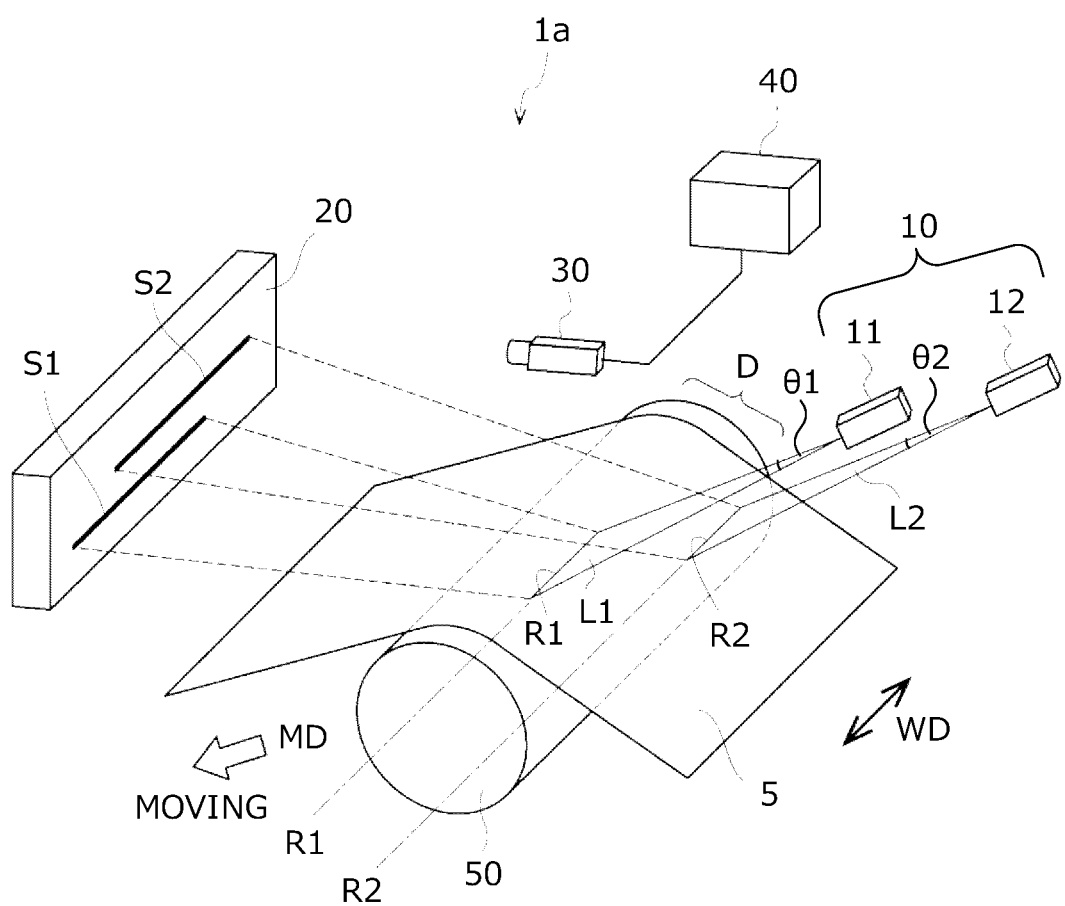
FIG. 13A is a perspective view schematically illustrating a surface measurement apparatus in a second embodiment.
Figure 13B:
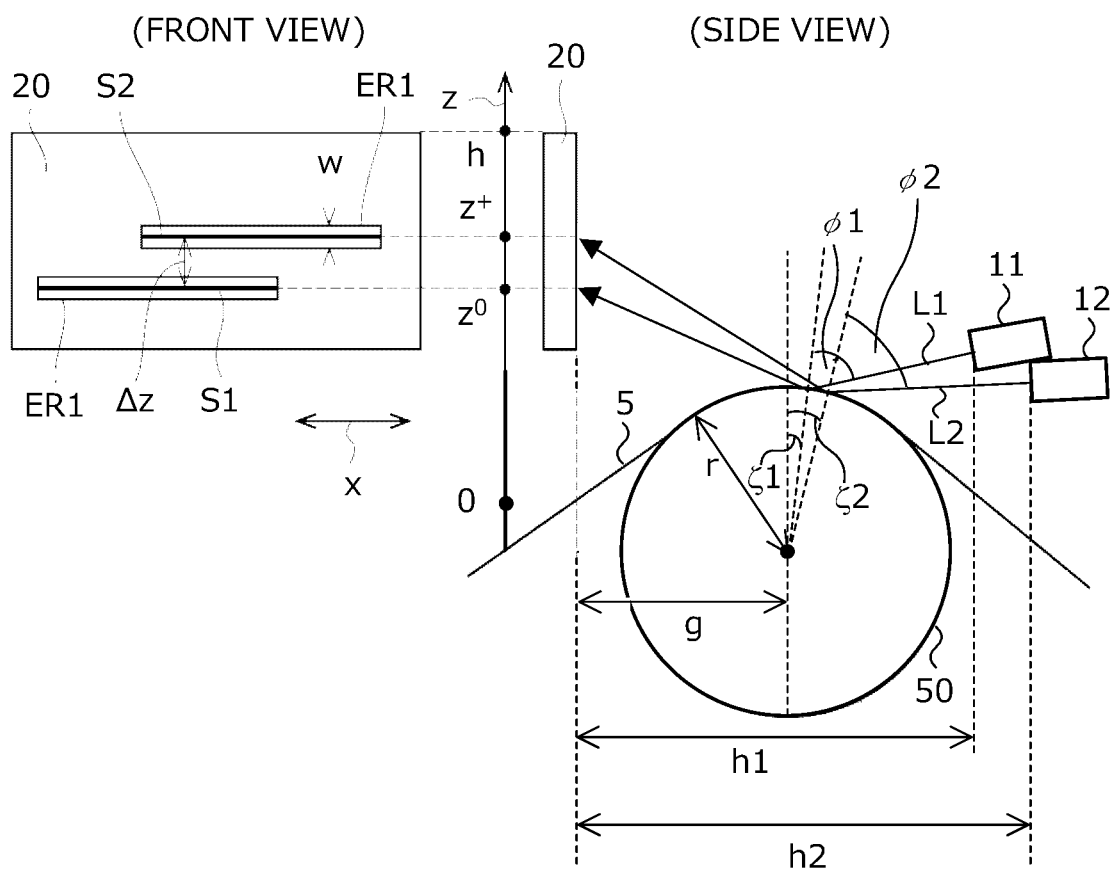
FIG. 13B is a side view of the surface measurement apparatus illustrated in FIG. 13A and a front view of a screen.

In the following, the surface measurement apparatus according to the second embodiment is explained in detail, using, as an example, the relationship between any two light sources out of N light sources, as in the first embodiment. FIG. 13A to FIG. 13B are views each schematically illustrating a surface measurement apparatus 1*a* according to the second embodiment of the present invention.

In the second embodiment, there is explained, as an example, an aspect in which the object to be measured 5 is moved while being curved along a curved surface of a roll 50 (in other words, an aspect in which the object to be measured 5 moves while being wound around the roll 50). In this embodiment, vibrations can be prevented because the object to be measured 5 is constrained by being wound around the roll 50. If tension is applied in the moving direction of the object to be measured 5, the vibration prevention effect is further improved.

The object to be measured 5 moves in the moving direction MD while forming a curved surface D along the curved surface of the roll 50 by abutting on the curved surface of the roll 50. Then, the surface of the object to be measured 5 is measured on the curved surface D of the object to be measured 5, which is formed by the curved surface of the roll 50. Since the other components of the surface measurement apparatus 1*a* in the second embodiment are the same as those of the surface measurement apparatus 1 in the first embodiment, the same reference numerals and symbols are added to the same parts, their explanations are omitted, and the second embodiment will be explained below while focusing on the configuration different from that of the first embodiment.

As illustrated in FIG. 13A, the surface measurement apparatus 1a according to the second embodiment of the present invention includes the N light sources 10 aligned in the width direction in the vicinity of the roll 50 (only the first light source 11, which is any one of the N light sources, and the second light source 12, which is one of the other light sources, are illustrated, and the other light sources are not illustrated), the screen 20, the image capturing device 30, and the arithmetic processing device 40. The light sources 10 are arranged to face the screen 20 across the roll 50. With the first light source 11 cited as an example, the first light source 11 emits the first line beam L1 from the upstream side of the object to be measured 5 in the moving direction MD to the curved surface D of the object to be measured 5 moving while being wound around the roll 50 of the transport line (the line beam emission step).

The line beam L1 is reflected on the first reflection region R1 of the curved surface D of the object to be measured 5, and the strip-shaped first reflected image S1 is projected on the first projection region of the screen 20 (the reflected image projection step). The same is applied to the second light source 12 and the other light sources.

On the right in FIG. 13B, the side view of FIG. 13A is illustrated, and on the left in FIG. 13B, the front view of the screen 20 is illustrated. As illustrated in FIG. 13B, the horizontal distance from an axial center of the roll 50 to the screen 20 is set as g, and the radius of the curved surface D of the object to be measured 5 formed by the curved surface of the roll 50 (namely, the distance from the axial center of the roll to the surface of the curved surface D) is set as r. The first light source 11 is located at a place horizontally away from the screen 20 by a distance h1, and is set to emit the first line beam to the reflection region R1 at a position of a reflection region angle $\zeta 1$ of the curved surface D of the object to be measured 5 at the incident angle $\phi 1$. Similarly, the second light source 12 is located at a place horizontally away from the screen 20 by a distance h2, and is set to emit the second line beam to the reflection region R2 at a position of a reflection region angle $\zeta 2$ of the curved surface D of the object to be measured 5 at the incident angle $\phi 2$.

Here, the incident angle is the angle between the normal direction of the surface (radial direction of the roll 50) and an optical axis of the line beam emitted from the light source in the reflection region of the object to be measured 5. Incidentally, as in the first embodiment, the first line beam L1 is emitted with the opening angle $\theta 1$, and the second line beam L2 is emitted with the opening angle $\theta 2$. The first light source 11 and the second light source 12 are arranged at positions separated by the distance M in the width direction WD.

Here, as long as the first reflected image and the second reflected image do not overlap in the z direction, which is the direction perpendicular to the width direction WD, on the screen, the first reflected image and the second reflected image do not overlap each other on the screen to be distinguishable from each other regardless of where the first reflected image and the second reflected image are located in the width direction WD. Here, "not overlapping in the z direction" means that the expression (1) is satisfied as in the first embodiment.

Incidentally, based on the geometric relationship, $\Delta z$ is expressed by the following equation (4) in the second embodiment.

[Mathematical equation 4]

$$\Delta z = \left| \frac{g + r\sin\zeta 1}{\tan(\phi 1 - \zeta 1)} - \frac{g + r\sin\psi\zeta 2}{\tan(\phi 2 - \zeta 2)} \right| \qquad \text{Equation (4)}$$

On the other hand, even if the first reflected image and the second reflected image overlap in the z direction on the screen, the first reflected image and the second reflected image are distinguishable from each other without overlapping each other on the screen unless the first reflected image and the second reflected image overlap in the width direction WD. In order to satisfy this condition, the relationship expressed in the following expression (5) only needs to be satisfied.

[Mathematical expression 5]

$$\left| \left( \frac{h - g - r\sin\zeta 1}{\sin(\phi 1 + \zeta 1)} + \frac{g + r\sin\zeta 1}{\sin(\phi 1 - \zeta 1)} \right) \tan\frac{\theta 1}{2} + \left( \frac{h - g - r\sin\zeta 2}{\sin(\phi 2 + \zeta 2)} + \frac{g + r\sin\zeta 2}{\sin(\phi 2 - \zeta 2)} \right) \tan\frac{\theta 2}{2} \right| < M \qquad \text{Expression (5)}$$

In the second embodiment, in order to prevent the first reflected image S1 and the second reflected image from overlapping each other, the arrangement of the respective light sources only needs to be determined so as to satisfy the relationship in the expression (1) or the expression (5).

In this embodiment, there is no particular limitation on the incident angle $\phi 1$ of the first line beam L1 on the object to be measured 5 or the incident angle $\phi 2$ of the second line beam L2 on the object to be measured 5, but for example, with the incident angles made the same, it is only necessary to make the reflection region angle $\zeta 1$ of the first reflection region R1 and the reflection region angle $\zeta 2$ of the second reflection region R2 different on the surface of the object to be measured 5 and simply displace the reflection regions from each other in the moving direction MD of the object to be measured 5. Incidentally, the meaning of the expression "the incident angles being the same" is as explained in the first embodiment.

This inevitably satisfies the expression (1), so that the first reflected image S1 and the second reflected image S2 can be projected on the screen 20 in a separated state without overlapping each other. Therefore, in the captured image acquired by the image capturing device 30, the first reflected image S1 and the second reflected image S2 are captured in a separated state in the z direction on the screen 20 without overlapping each other.

Further, under the condition that the N light sources each satisfy the expression (1) or the expression (5), the N light sources may be arranged so that the reflection regions irradiated with the line beams from the N light sources are arranged in a staggered pattern where the reflection regions are alternately different in the moving direction along the width direction. Such a staggered arrangement is useful when the range in the moving direction that can be secured as the reflection region is limited.

On the other hand, with the reflection region angle $\zeta 1$ of the first reflection region R1 and the reflection region angle $\zeta 2$ of the second reflection region R2 made the same on the surface of the object to be measured 5, the incident angle $\phi 1$ of the first line beam L1 on the object to be measured 5 and the incident angle $\phi 2$ of the second line beam L2 on the object to be measured 5 may be made different. Such a configuration is useful when the range in the moving direction that can be secured as the reflection region is extremely limited.

This inevitably satisfies the expression (1), so that the first reflected image S1 and the second reflected image S2 can be projected on the screen 20 in a separated state without overlapping each other. Accordingly, in the captured image acquired by the image capturing device 30, the first reflected image S1 and the second reflected image S2 are captured in a separated state in the z direction on the screen 20 without overlapping each other.

Further, under the condition that the N light sources each satisfy the expression (1) or the expression (5), the N light sources may be arranged so that the incident angles of the line beams emitted from the N light sources on the object to be measured 5 are arranged in a staggered pattern where they are alternately different in the moving direction along the width direction. Such a configuration is useful in the case where, in addition to the reflection region, the position range where the light source is arranged is limited in the moving direction.

Figure 14:
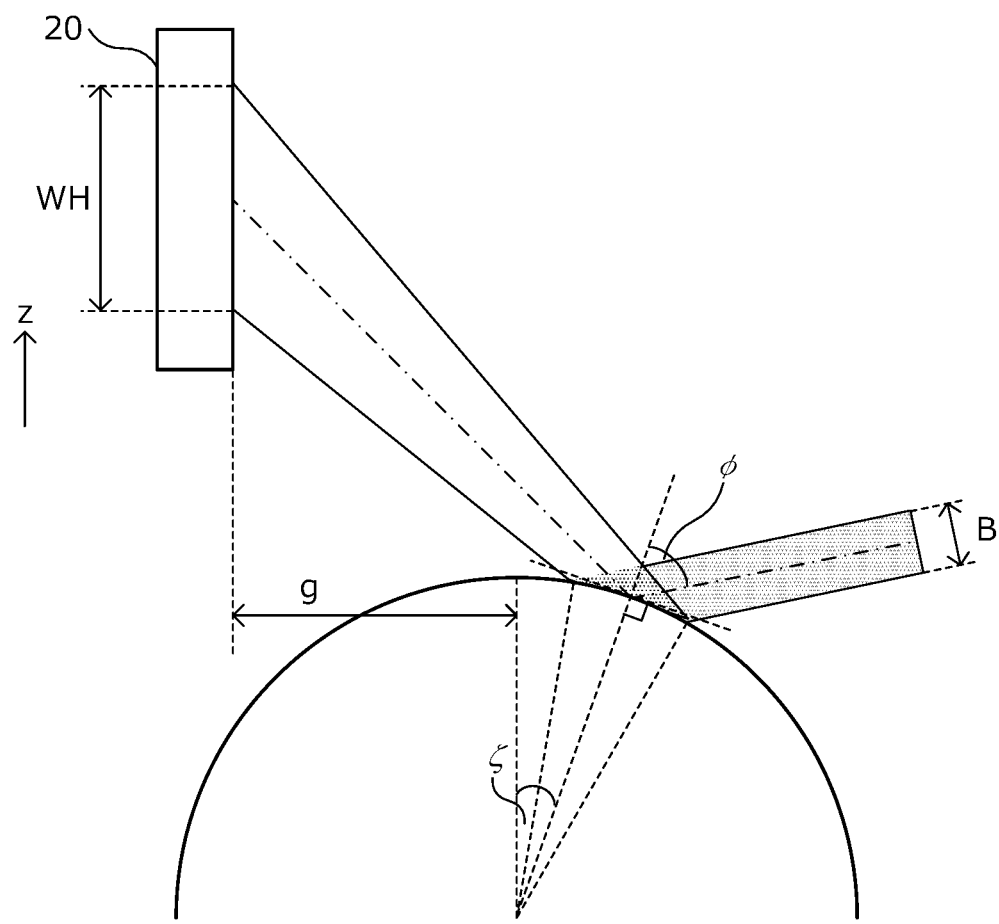
FIG. 14 is a schematic view for explaining the relationship between a width of line beam emitted from a light source and a width of a reflected image reflected on a curved surface to be projected on the screen.

Further, in this embodiment, as illustrated in FIG. 14, since the line beam emitted from the light source is reflected on the curved surface D, a thickness (thickness in the z direction) WH of the line beam of the reflected image S on the screen 20 relies on the reflection region angle $\zeta$ and the incident angle $\phi$ of the line beam, and is enlarged to be larger than a beam diameter B of the line beam emitted from the light source. Therefore, compared to the first embodiment in which the line beam is reflected on a plane, it is necessary to set $\Delta z$ to be larger in the second embodiment.

The image capturing device 30 captures these first reflected image S1 and second reflected image S2 on the screen 20 (the image capturing step), and outputs an acquired captured image to the arithmetic processing device 40. The arithmetic processing device 40 performs image processing by using the captured image of the first reflected image S1 and the second reflected image S2, to thereby calculate the surface shape or the like of the object to be measured 5 and measure the surface of the object to be measured 5 (the arithmetic processing step). Incidentally, measuring the surface of the object to be measured 5 by the arithmetic processing device 40 is the same as in the above-described first embodiment, and thus, its explanation is omitted here.

Function and Effect of the Second Embodiment

In the above configuration, in the surface measurement apparatus 1a according to the second embodiment, the reflected images of the line beams emitted from the N light sources are projected on the screen 20 so as not to overlap each other even when measuring the surface of the object to be measured 5 with the curved surface D being formed. Therefore, it is possible to prevent the generation of an unmeasurable region caused by overlapping of the reflected images projected on the screen 20 even if the N light sources are arranged to measure the surface of the object to be measured 5 having a wide width.

Here, in such an embodiment as illustrated in FIG. 13A and FIG. 13B, there is explained again the example where four light sources are installed and the four reflected images S1, S2, S3, and S4 are projected on the screen 20 below while using FIG. 12.

Even in the case illustrated in FIG. 12, one of the two conditions described above is established.

In other words, as illustrated in FIG. 12, on the screen 20, the reflected image S1, the reflected image S2, and the reflected image S4 do not overlap each other along the z direction of the screen 20. Similarly, the reflected image S2, the reflected image S3, and the reflected image S4 do not overlap each other. This is because the relationship in the expression (1) is satisfied.

Further, on the screen 20, the reflected image S1 and the reflected image S4 overlap in the z direction, but do not overlap in the width direction. This is because the relationship in the expression (5) is satisfied.

Third Embodiment

The third embodiment of the present invention, which will be explained in detail below, focuses on the case where line beams emitted from a plurality of light sources are distinguishable in terms of the timing of emitting the line beam to the surface of the object to be measured. In this third embodiment, a plurality of the light sources control emission times of the line beams from the N light sources so as to prevent all the reflected images on the surface of the object to be measured, which are projected on the screen, from overlapping at the time when the image capturing device captures an image, and thereby the reflected images are projected on the screen to be distinguishable from each other.

A detailed explanation is given below by citing, as an example, in a surface measurement apparatus including the N light sources 10 in the third embodiment, a reflected image of line beam emitted from the first light source 11, which is any one of the N light sources 10, and a reflected image of line beam emitted from the second light source 12, which is one of the other light sources.

Figure 15A:
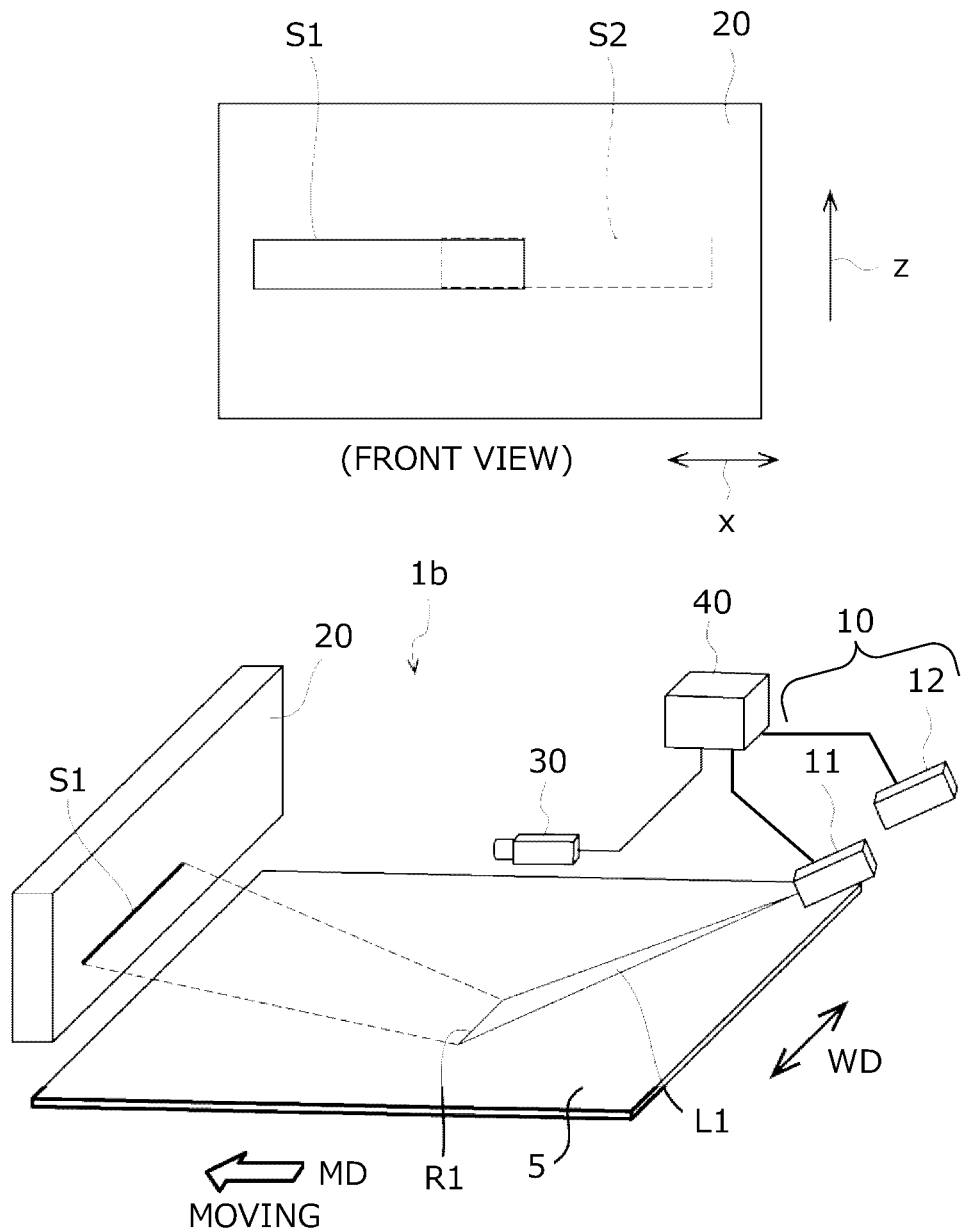
FIG. 15A is a perspective view for explaining a surface measurement apparatus in a third embodiment and a front view of a screen.
Figure 15B:
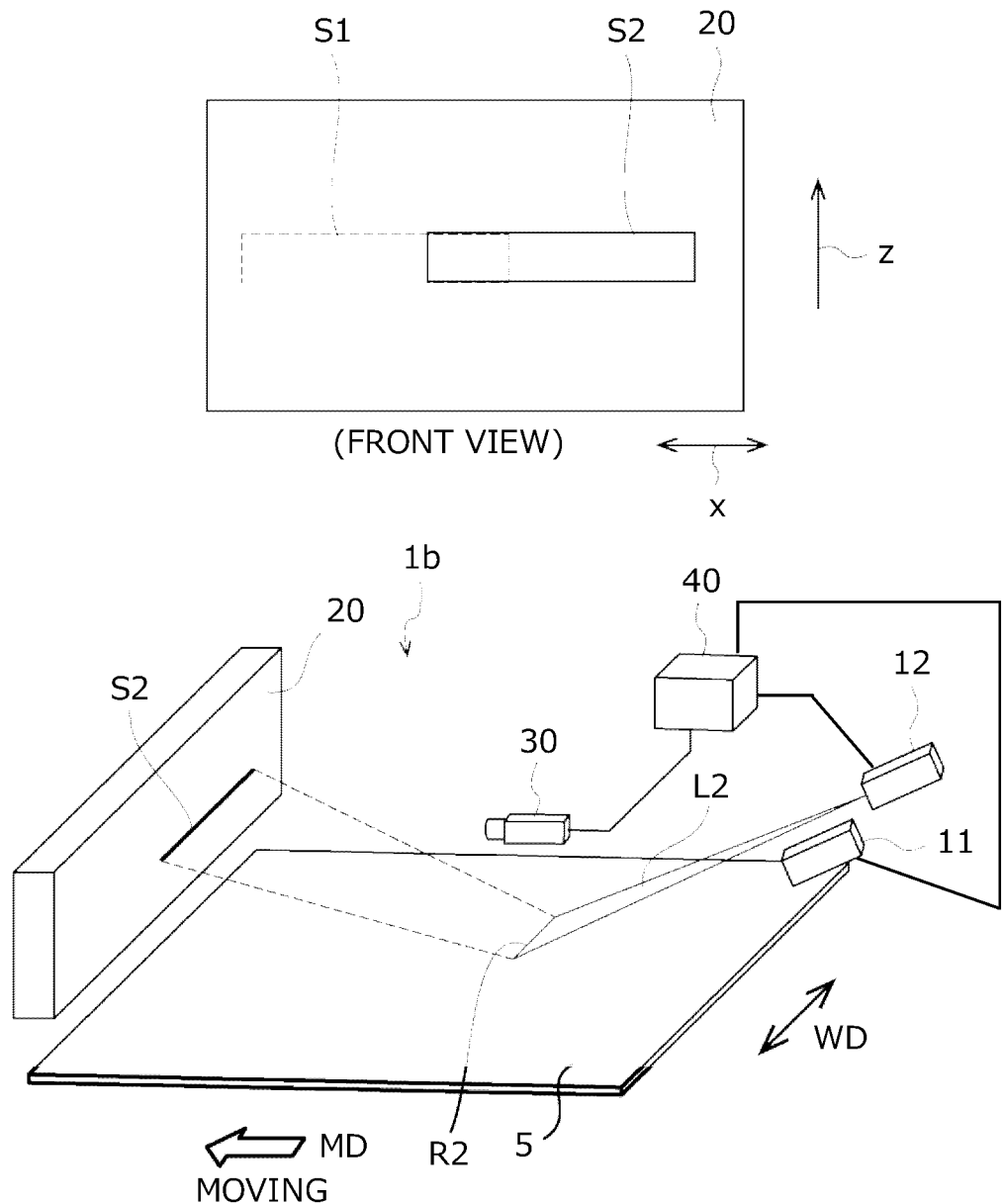
FIG. 15B is a perspective view for explaining the surface measurement apparatus in the third embodiment and a front view of the screen.

FIG. 15A and FIG. 15B are views for explaining a surface measurement apparatus 1b according to the third embodiment. The surface measurement apparatus 1b includes, similarly to the surface measurement apparatus 1 according to the first embodiment, the N light sources 10 that emit the line beam L from the upstream side in the moving direction MD of the object to be measured 5 to the surface of the object to be measured 5 moving on a plane of a transport line (the light sources other than the first light source 11 and the second light source 12 are not illustrated), the screen 20, the image capturing device 30, and the arithmetic processing device 40 to which the image capturing device 30 is connected. The third embodiment is the same as the first embodiment except that there is no restriction on the arrangement of the components such that the reflected images do not overlap each other on the screen, and thus, the explanations of the components and the reference numerals and symbols are omitted. Incidentally, FIG. 15A illustrates a state where the line beam L1 is emitted from the light source 11 and the first reflected image S1 is projected on the screen 20. Further, S2 indicated by a dotted line denotes the reflected image S2 projected on the screen when the line beam L2 is emitted from the light source 12. FIG. 15B illustrates a state where in place of the light source 11, the light source 12 emits the line beam L2 and the second reflected image S2 is projected on the screen 20.

In addition to the above-described configuration, the surface measurement apparatus 1b in the third embodiment includes a configuration in which the arithmetic processing device 40 is connected also to the light sources 10, and the arithmetic processing device 40 controls an emission time of each of the N light sources 10.

Here, there is explained, as an example, an embodiment where the distance M between the light source 11 and the light source 12 is small as in the example illustrated in FIG. 4B, for example, the incident angle of the first line beam L1 on the object to be measured 5 and the incident angle of the second line beam L2 on the object to be measured 5 are the same, and the distance d1 from the screen to the reflection region R1 and the distance d2 from the screen to the reflection region R2 are the same (namely, an embodiment that does not satisfy the above-described expression 1 or 3), but the incident angles and the positions of the reflection regions are not limited in particular.

As a result, in the third embodiment, the first reflected image S1 and the second reflected image S2, which are to be projected on the screen 20 by the first line beam L1 and the second line beam L2 being reflected on the object to be measured 5, are projected at positions that are the same in the z direction of the screen 20, the positions where they partially overlap in the width direction x of the screen 20.

Here, in the third embodiment, the arithmetic processing device 40 controls the emission times of the first light source 11 and the second light source 12 to be shifted so as to prevent the first reflected image S1 and the second reflected image S2 from appearing on the screen 20 simultaneously, and the arithmetic processing device 40 controls the image capturing device 30 to perform image capturing at a timing when the first reflected image S1 and the second reflected image S2 do not overlap on the screen 20.

As illustrated in FIG. 15A and FIG. 15B, in the surface measurement apparatus 1b according to the third embodiment, the first reflection region R1 and the second reflection region R2 are arranged at the same position in the moving direction MD of the object to be measured 5. Further, the first light source 11 and the second light source 12 are arranged in line along the width direction WD, and the first reflection region R1 and the second reflection region R2 are arranged in a continuous manner in the width direction WD. Then, the first light source 11 and the second light source 12 emit the first line beam L1 and the second line beam L2 to the positions that are the same in the moving direction MD of the object to be measured 5 and consecutive in the width direction WD (the line beam emission step).

There is conceived a case where the first line beam L1 and the second line beam L2 are reflected on the object to be measured 5, the first reflected light and the second reflected light spread in a fan shape toward the screen 20, and the first reflected image S1 and the second reflected image S2 are projected on the screen 20. In this case, the first reflected image S1 and the second reflected image S2 are projected at the positions where they overlap partially in the width direction x of the screen 20 at the same height position in the z direction of the screen 20 (the reflected image projection step).

In the surface measurement apparatus 1b, as illustrated in FIG. 15A, the first line beam L1 emitted from the first light source 11 is first reflected on the surface of the object to be measured 5, and the first reflected image S1 is projected on the first projection region of the screen 20. Thereby, only the first line beam L1 is reflected on the object to be measured 5, and only the first reflected image S1 is projected on the screen 20. Then, as illustrated in FIG. 15B, after the emission of the first line beam L1 by the first light source 11 is stopped, emission of the second line beam L2 by the second line beam L2 is started. Thereby, only the second line beam L2 is reflected on the object to be measured 5, and only the second reflected image S2 is projected on the second projection region of the screen 20. In this way, the first light source 11 and the second light source 12 emit the first line beam L1 and the second line beam L2 alternately.

At this time, the image capturing device 30 captures an image of the screen 20 in synchronization with the emission times of the first light source 11 and the second light source 12 based on a control signal from the arithmetic processing device 40 (the image capturing step). In this way, the first light source 11 and the second light source 12 emit the line beam at different emission times and the time at which the image capturing device 30 captures an image of the screen 20 is adjusted to each of the emission times, and thereby, the image capturing device 30 captures an image of the screen 20 on which only one of the first reflected image S1 and the second reflected image S2 is projected, and acquires a captured image.

Incidentally, the arithmetic processing device 40 includes, for example, a PLG (Pulse Generator), which synchronizes the emission times of the first light source 11 and the second light source 12 with the image capturing time of the image capturing device 30 by means of pulses generated by the movement of the object to be measured 5.

The image capturing device 30 alternately acquires the captured image acquired by capturing the first reflected image S1 on the first projection region of the screen 20 in accordance with the emission time of the first light source 11, and the captured image acquired by capturing the second reflected image S2 on the second projection region of the screen 20 in accordance with the emission time of the second light source 12 to output the acquired captured images to the arithmetic processing device 40.

Thereby, the arithmetic processing device 40 can perform the surface measurement of the object to be measured 5 based on the captured image of one of the first line beam and the second line beam acquired by the image capturing device 30, as in the first embodiment described above (the arithmetic processing step). Incidentally, since the surface measurement of the object to be measured 5 by the arithmetic processing device 40 is the same as that of the first embodiment described above, its explanation is omitted here.

Function and Effect of the Third Embodiment

In the above configuration, in the surface measurement apparatus 1b according to the third embodiment, the emission times of the line beams from the N light sources are controlled so as to prevent the reflected images of the line beams emitted from the N light sources from overlapping each other. Specifically, as illustrated in FIG. 15A and FIG. 15B, the first line beam L1 and the second line beam L2 are emitted so that the arbitrary first reflected image S1 and second reflected image S2 out of the N reflected images are projected at the positions where they partially overlap on the screen 20. In this case, the emission times are shifted between the first light source 11 and the second light source 12, and the first reflected image S1 and the second reflected image S2 are projected alternately on the screen 20. The surface measurement apparatus 1b synchronizes the image capturing time of the image capturing device 30 with each of the emission times of the first light source 11 and the second light source 12, to thereby acquire a captured image in which only one of the first reflected image S1 and the second reflected image S2 is captured without overlapping of the first reflected image S1 and the second reflected image S2.

Therefore, unlike the first and second embodiments, the surface measurement apparatus 1b in the third embodiment can prevent the generation of an unmeasurable region caused by overlapping of the first reflected image S1 and the second reflected image S2 projected on the screen 20 without limiting the position of the reflection region in the moving direction MD or the incident angle ϕ.

Incidentally, in the above-described third embodiment, as long as the reflected images of the line beams emitted from the light sources aligned in the width direction, for example, are adjacent to each other and overlap, the emission time of the odd-numbered light source in the width direction and the emission time of the even-numbered light source in the width direction only need to be shifted and synchronized with the image capturing time of the image capturing device 30, and image capturing only needs to be performed at each of the emission times. As long as the reflected image overlaps not only an adjacent reflected image, but also a reflected image adjacent to this adjacent reflected image, the emission times of the 3kth, (3k+1)th, and (3k+2)th light sources (k being an integer that is equal to or more than zero) in the width direction only need to be shifted and synchronized with the image capturing time of the image capturing device 30, and image capturing only needs to be performed at each of the emission times. As a matter of course, it is also possible to shift the emission times of all the light sources and perform image capturing at each of the emission times. In this case, only one reflected image is captured in one captured image, which facilitates image processing.

Further, in the above-described third embodiment, the case where the single image capturing device 30 performs image capturing has been explained, but the present invention is not limited to this, and for example, a plurality of image capturing devices may capture respective reflected images individually.

Fourth Embodiment

The fourth embodiment of the present invention, which will be explained in detail below, focuses on the case where line beams emitted from a plurality of light sources are distinguishable in terms of wavelength. In other words, in the fourth embodiment of the present invention, which will be explained in detail below, wavelengths of the line beams that form the reflected images overlapping on the screen are different from each other.

In the following, there is explained in detail, as an example, the case where the position of a reflected image of line beam emitted from the first light source 11, which is any one of the N light sources, and the position of a reflected image of line beam emitted from the second light source 12, which is one of the other light sources, overlap.

Figure 16:
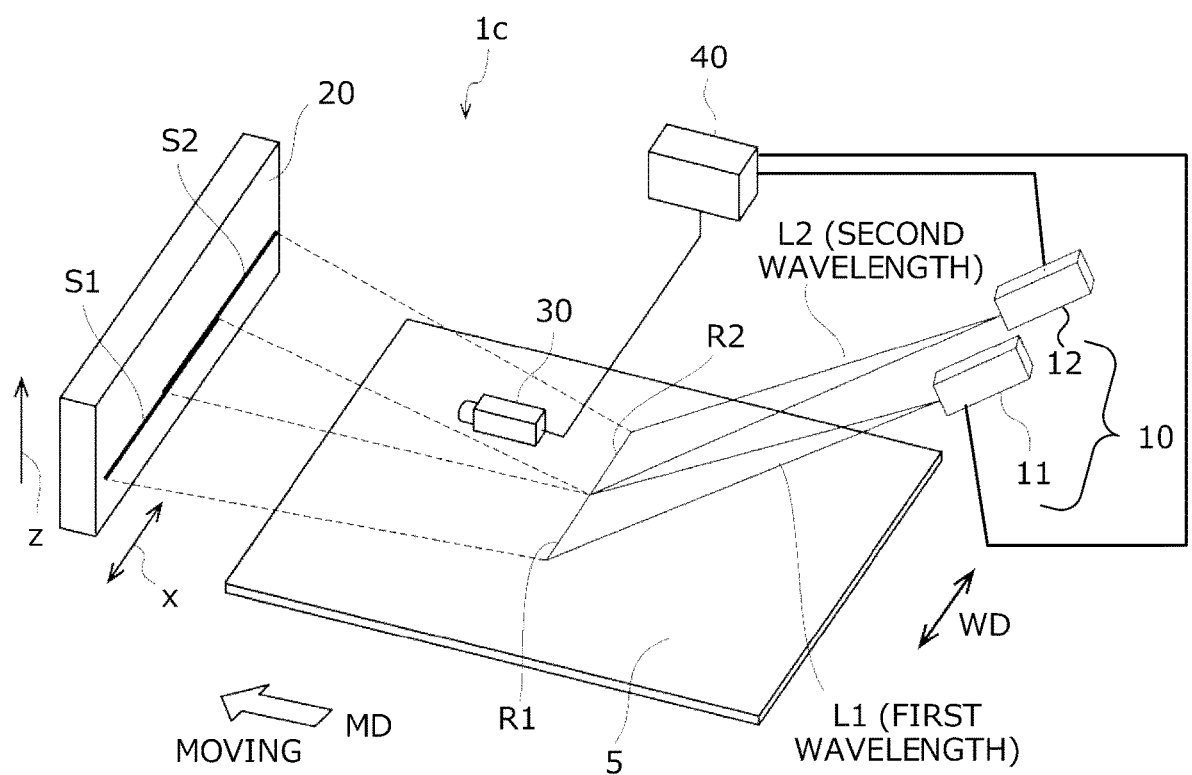
FIG. 16 is a perspective view for explaining a surface measurement apparatus in a fourth embodiment.

FIG. 16 is a view for explaining a surface measurement apparatus 1c according to the fourth embodiment. FIG. 16 illustrates the first light source 11, which is any one of the N light sources 10, the second light source 12, which is one of the other N light sources 10, the screen 20, the image capturing device 30, and the arithmetic processing device 40 to which the image capturing device 30 is connected, where the light sources other than these, line beams, reflected images, and so on are not illustrated. The fourth embodiment is the same as the first embodiment except that there is no restriction on the arrangement of the components such that the reflected images do not overlap each other on the screen, and thus, the explanations of the components and the reference numerals and symbols are omitted. Incidentally, unlike the first embodiment, the wavelengths of the line beams emitted from the respective light sources are set appropriately as will be described later.

The surface measurement apparatus 1c includes the first light source 11 and the second light source 12 that emit the first line beam L1 and the second line beam L2 from the upstream side of the object to be measured 5 in the moving direction MD to the surface of the object to be measured 5 moving on a plane of a transport line.

Here, there is explained, as an example, an embodiment where the distance M between the light source 11 and the light source 12 is small as in the example illustrated in FIG. 4B, for example, the incident angle of the first line beam L1 on the object to be measured 5 and the incident angle of the second line beam L2 on the object to be measured 5 are the same, and the distance d1 from the screen to the reflection region R1 and the distance d2 from the screen to the reflection region R2 are the same (namely, an embodiment that does not satisfy the above-described expression 1 or 3), but the incident angles and the positions of the reflection regions are not limited in particular.

As a result, in the fourth embodiment, the first reflected image S1 and the second reflected image S2, which are to be projected on the screen 20 by the first line beam L1 and the second line beam L2 being reflected on the object to be measured 5, are located at the same position in the z direction of the screen 20 and partially overlap in the width direction x of the screen 20.

The fourth embodiment is configured so that the first line beam L1 emitted from the first light source 11 and the second line beam L2 emitted from the second light source 12 are made different in wavelength and the first reflected image S1 and the second reflected image S2 projected on the screen 20 can be separated according to the difference in wavelength.

As illustrated in FIG. 16, in the surface measurement apparatus 1c in the fourth embodiment, the first light source 11 and the second light source 12 have the same incident angle ϕ, and the first reflection region R1 and the second reflection region R2 are located at a place of the same position in the moving direction MD of the object to be measured 5. Then, the first light source 11 and the second light source 12 emit the first line beam L1 and the second line beam L2 that have wavelengths different from each other (the line beam emission step).

In the surface measurement apparatus 1c in the fourth embodiment, the wavelength of the first line beam L1 emitted from the first light source 11 is set to a first wavelength and the wavelength of the second line beam L2 emitted from the second light source 12 is set to a second wavelength different from the first wavelength, and thereby the first reflected image S1 and the second reflected image S2 are projected on the screen 20 separably based on the difference in wavelength (the reflected image projection step).

The first line beam L1 emitted from the first light source 11 and the second line beam L2 emitted from the second light source 12 are set in different wavelength bands such that they can be separated by a well-known optical filter (such as, for example, a high-pass filter, a low-pass filter, or a band-pass filter).

Further, the surface measurement apparatus 1c in the fourth embodiment includes the image capturing device 30, and the image capturing device 30 captures the first reflected image S1 and the second reflected image S2 projected on the screen 20 (the image capturing step).

In the fourth embodiment, the image capturing device 30 captures the first reflected image S1 and the second reflected image S2 projected on the screen 20 in a state of partially overlapping on the screen 20, and acquires a captured image.

The image capturing device 30 is connected to the arithmetic processing device 40, and outputs the captured image in which the first reflected image S1 and the second reflected image S2 on the screen 20 are captured to the arithmetic processing device 40.

Thereby, the arithmetic processing device 40 separates a component of the first wavelength and a component of the second wavelength from components of RGB contained in the captured image on data based on the captured image acquired by the image capturing device 30. The components of the respective wavelengths correspond to the shape of the object to be measured 5 in the first reflection region R1 and the second reflection region R2, and thus, the surface of the object to be measured 5 can be measured from data corresponding to the first wavelength and data corresponding to the second wavelength.

Incidentally, the image capturing device 30 may be an image capturing device 30 including a plurality of image capturing units. In this case, the image capturing units with optical filters having different transmission wavelength bands attached thereto perform image capturing, thereby making it also possible to separate the component of the first wavelength and the component of the second wavelength. In that case, the image capturing device 30 individually captures an image in which the first reflected image S1 and the second reflected image S2 are separated according to the difference between the first wavelength and the second wavelength. In this way, the arithmetic processing device 40 can also measure the surface of the object to be measured 5 from the captured images in which first reflected image S1 and the second reflected image S2 are captured independently.

Function and Effect of the Fourth Embodiment

In the above configuration, in the surface measurement apparatus 1c according to the fourth embodiment, the wavelengths of the respective light sources are set so as to make the wavelengths of the line beams emitted from any two adjacent light sources out of the N light sources different. Specifically, as illustrated in FIG. 16, the first line beam L1 and the second line beam L2 are emitted so that the first reflected image S1 and the second reflected image S2 are projected at the positions where they partially overlap on the screen 20. The image capturing device 30 once captures the first reflected image S1, which is projected on the screen 20 by the first line beam L1 having the first wavelength being reflected on the object to be measured 5, and the second reflected image S2, which is projected on the screen 20 by the second line beam L2 having the second wavelength being reflected on the object to be measured 5, and then separate the first reflected image S1 and the second reflected image S2 on data according to the difference in wavelength. In this way, the arithmetic processing device 40 can separate the first reflected image S1 and the second reflected image S2 from the captured images in which the first reflected image S1 and the second reflected image S2 are captured according to the difference in wavelength, and measure the surface of the object to be measured 5 based on obtained data.

From the above, even the surface measurement apparatus 1c can prevent the generation of an unmeasurable region caused by overlapping of the first reflected image S1 and the second reflected image S2 projected on the screen 20 even if the first light source 11 and the second light source 12 are arranged to measure the surface of the object to be measured 5 having a wide width.

In the above-described fourth embodiment, as illustrated in FIG. 16, the case of focusing on the first light source 11 and the second light source 12, which are any two light sources out of the N light sources, has been explained. Incidentally, in the present invention, the wavelengths of all the N light sources may be different, or only the wavelengths of the light sources that can overlap each other on the screen may be different.

Contents Common to the Embodiments

Incidentally, in each of the above-described embodiments, the fact that the incident angle of the first line beam L1 emitted from any one of the N light sources on the object to be measured and the incident angle of the second line beam L2 emitted from another one of the other light sources on the object to be measured 5 are the same incident angle ϕ includes not only the angles that are the same with no deviation at all, but also a slight deviation (error) to be caused when the first light source 11 and the second light source 12, and the like are installed.

Further, the fact that the first reflection region R1 and the second reflection region R2, which are arbitrary out of the N reflection regions, are at the same position in the moving direction MD of the object to be measured 5 includes not only the positions that are the same with no deviation at all, but also a slight deviation to be caused when the first light source 11 and the second light source 12, which are any two out of the N light sources, and the like are installed. Even in the case where such a slight deviation has been caused, it is possible to prevent the generation of an unmeasurable region caused by overlapping of the first reflected image S1 and the second reflected image S2 projected on the screen 20 when measuring the surface of the object to be measured 5 having a wide width, and further, the region that is unmeasured because the object to be measured 5 is not irradiated with light is not generated, thus making it possible to prevent the measurement omission of the object to be measured 5.

Here, in each of the above-described embodiments, in the case where the first light source and the second light source are adjacent to each other, in order to prevent the generation of a non-measurement portion where the surface of the object to be measured 5 is not measured in the width direction WD between the first reflection region R1 and the second reflection region R2, the light sources are preferably arranged to make each moving direction projected reflection region in which the reflection region on the surface of the object to be measured is projected in the moving direction MD of the object to be measured overlap an adjacent moving direction projected reflection region in the width direction WD.

Specifically, the explanation is made using FIG. 4B. In the case where the first light source and the second light source are adjacent to each other, an end E1 out of both ends of the first reflection region R1 of the first line beam L1, which is closer to the second reflection region R2, and an end E3 out of both ends of the second reflection region R2 of the second line beam L2, which is closer to the first reflection region R1, are preferably located at the same position in the width direction WD. As a result, when the first reflection region R1 and the second reflection region R2 are combined, the region from an end E2 on the side far from the second reflection region R2 out of the both ends of the first reflection region R1 to an end E4 on the side far from the first reflection region R1 out of the both ends of the second reflection region R2 is continuous in the width direction WD on the object to be measured 5.

Incidentally, in the above-described first embodiment, E1 and E3 are located at the same position in the width direction WD to make the first reflection region R1 and the second reflection region R2 continuous without having a gap therebetween in the width direction WD, but the present invention is not limited to this. For example, the first reflection region R1 and the second reflection region R2 may be arranged in the width direction WD so that E1 and E3 are located at positions where they partially overlap when viewed from the moving direction MD, to thereby make the first reflection region R1 and the second reflection region R2 continuous in the width direction WD.

Here, in FIG. 4A, FIG. 13A, FIG. 15A, and FIG. 16, the two light sources, which are the first light source 11 and the second light source 12, irradiate predetermined regions in the width direction WD with the first line beam L1 and the second line beam L2, and do not irradiate both end sides of the object to be measured 5 with the line beams. In practice, however, the entire region in the width direction WD is preferably irradiated with the line beams, and, for example, the number of light sources, the width of the line beam, or the like is adjusted. Thereby, the region that is unmeasured because of not being irradiated with line beam is not generated, thus making it possible to prevent the measurement omission of the object to be measured 5. As a result, even the surface of the object to be measured 5 having a wide width can be measured with high reliability over the entire surface.

Furthermore, in all the embodiments described above, there has been explained the case where the light source 10 is arranged upstream of the moving direction MD and the screen 20 is arranged downstream of the moving direction MD, but the present invention is not limited to this, and for example, the light source 10 may be arranged downstream of the moving direction MD and the screen 20 may be arranged upstream of the moving direction MD.

Further, the first embodiment and the third embodiment may be implemented in a combined manner. In other words, reflected images in one combination may be projected at different positions on the screen, and reflected images in the other combination may have different emission timings. Further, reflected images in a combination or all the combinations may be projected at different positions and have different emission timings.

Similarly, the first embodiment and the fourth embodiment may be implemented in a combined manner. That is, reflected images in one combination may be projected on the screen separately and reflected images in the other combination may have different wavelengths. Further, reflected images in a combination or all the combinations may be projected at different positions on the screen and have different wavelengths.

Further, the second embodiment and the third embodiment may be implemented in a combined manner. That is, the surface of the object to be measured 5, which is along the curved surface of the roll 50, may be set as an irradiation target with the line beam, reflected images in one combination may be projected at different positions on the screen, and reflected images in the other combination may have emission timings different between the reflected images. Further, reflected images in a combination or all the combinations may be projected at different positions and have different emission timings.

Similarly, the second embodiment and the fourth embodiment may be implemented in a combined manner. That is, the surface of the object to be measured 5, which is along the curved surface of the roll 50, may be set as an irradiation target with the line beam, reflected images in one combination may be projected separately on the screen, and reflected images in the other combination may have different wavelengths. Further, reflected images in a combination or all the combinations may be projected at different positions on the screen and have different wavelengths.

Furthermore, the first embodiment, the third embodiment, and the fourth embodiment may be implemented in a combined manner. That is, reflected images in one combination may be projected separately on the screen, reflected images in some combinations may have emission timings different between the reflected images, and reflected images in the other combination may have wavelengths different between the reflected images. Further, reflected images in a combination or all the combinations may be projected at different positions on the screen, have different emission timings, and have different wavelengths.

Furthermore, the second embodiment, the third embodiment, and the fourth embodiment may be implemented in a combined manner. That is, the surface of the object to be measured 5, which is along the curved surface of the roll 50, may be set as an irradiation target with the line beam, reflected images in one combination may be projected separately on the screen, reflected images in some combinations may have emission timings different between the reflected images, and reflected images in the other combination may have wavelengths different between the reflected images. Further, reflected images in a combination or all the combinations may be projected at different positions on the screen, have different emission timings, and have different wavelengths.

(One Example of a Hardware Configuration of the Arithmetic Processing Device 40)

Figure 17:
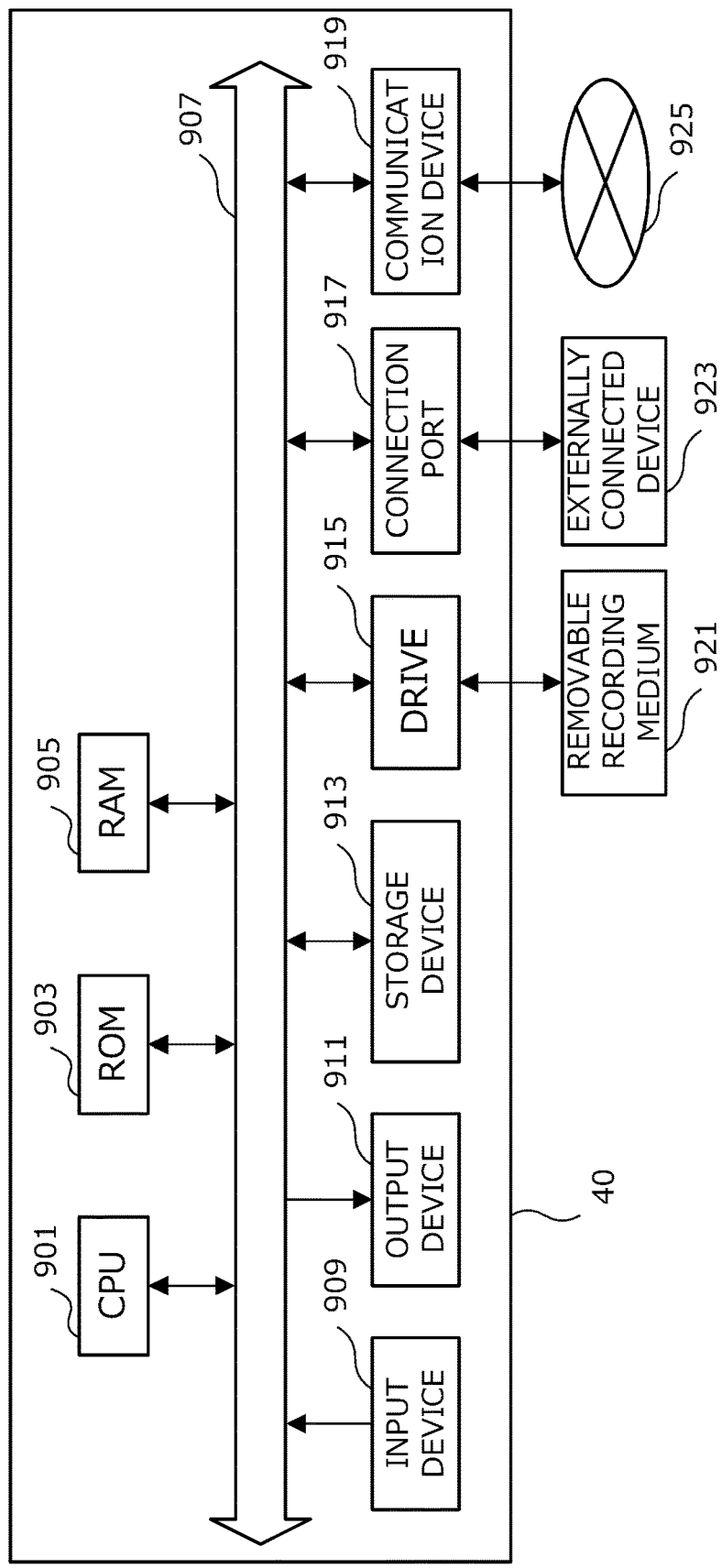
FIG. 17 is a block diagram schematically illustrating one example of a hardware configuration of the arithmetic processing device.

Next, there is explained in detail a hardware configuration of the arithmetic processing device 40 in each of the embodiments of the present invention with reference to FIG. 17. FIG. 17 is a block diagram for explaining the hardware configuration of the arithmetic processing device 40 in each of the embodiments of the present invention.

The arithmetic processing device 40 includes a processor, and in more detail, mainly includes a CPU 901, a ROM 903, and a RAM 905. The arithmetic processing device 40 further includes a bus 907, an input device 909, an output device 911, a storage device 913, a drive 915, a connection port 917, and a communication device 919.

The CPU 901 functions as a central processing device and a control device, and controls the overall operation or a part of the operation of the arithmetic processing device 40 according to various programs recorded in the ROM 903, the RAM 905, the storage device 913, or a removable recording medium 921. The ROM 903 stores programs, operation parameters, and so on used by the CPU 901. The RAM 905 primarily stores programs used by the CPU 901 and parameters, and so on to vary as appropriate during the execution of the programs. These are connected with each other via the bus 907 formed of an internal bus such as a CPU bus.

The bus 907 is connected to an external bus such as a PCI (Peripheral Component Interconnect/Interface) bus via a bridge.

The input device 909 is an operation means manipulated by a user, such as, for example, a mouse, a keyboard, a touch panel, buttons, a switch, or a lever. Further, the input device 909 may be a remote control means (what is called a remote control) using, for example, infrared light or other radio waves, or may be an externally connected device 923 such as a PDA, which responds to the operation of the arithmetic processing device 40. Furthermore, the input device 909 generates an input signal based on, for example, information that is input by a user using the above-described operation means, and is configured by an input control circuit that outputs the input signal to the CPU 901, or the like. The user can input various data to the arithmetic processing device 40 and can instruct the arithmetic processing device 40 to perform processing by manipulating this input device 909.

The output device 911 is configured by a device capable of visually or audibly notifying a user of acquired information. Examples of such a device include display devices such as a CRT display device, a liquid crystal display device, a plasma display device, an EL display device, and lamps, audio output devices such as a speaker and a headphone, a printer, a mobile phone, a facsimile machine, and so on. For example, the output device 911 outputs results obtained by various pieces of processing performed by the arithmetic processing device 40. Specifically, the display device displays, in the form of texts or images, the result obtained by various pieces of processing performed by the arithmetic processing device 40. On the other hand, the audio output device converts an audio signal made of reproduced audio data, sound data, or the like into an analog signal to output the analog signal.

The storage device 913 is a device for storing data configured as an example of a storage unit of the arithmetic processing device 40. The storage device 913 is configured by, for example, a magnetic storage device such as a HDD (Hard Disk Drive), a semiconductor storage device, an optical storage device, a magneto-optical storage device, or the like. This storage device 913 stores programs to be executed by the CPU 901, various data, various data acquired from the outside, and so on.

The drive 915 is a reader/writer for recording medium, and is embedded in the arithmetic processing device 40 or attached thereto externally. The drive 915 reads information recorded in the attached removable recording medium 921 such as a magnetic disk, an optical disk, a magneto-optical disk, or a semiconductor memory, and outputs the read information to the RAM 905. Further, the drive 915 can also write records in the attached removable recording medium 921 such as a magnetic disk, an optical disk, a magneto-optical disk, or a semiconductor memory. The removable recording medium 921 is, for example, a CD medium, a DVD medium, a Blu-ray (registered trademark) medium, or the like. Further, the removable recording medium 921 may be a CompactFlash (CF; registered trademark), a flash memory, an SD memory card (Secure Digital Memory Card), or the like. Further, the removable recording medium 921 may be, for example, an IC card (Integrated Circuit Card) equipped with a non-contact IC chip, an electronic device, or the like.

The connection port 917 is a port for allowing devices to directly connect to the arithmetic processing device 40. Examples of the connection port 917 include a USB (Universal Serial Bus) port, an IEEE1394 port, a SCSI (Small Computer System Interface) port, an RS-232C port, and so on. By the externally connected device 923 being connected to this connection port 917, the arithmetic processing device 40 directly acquires various data from the externally connected device 923 and provides various data to the externally connected device 923.

The communication device 919 is a communication interface configured by, for example, a communication device for connecting to a communication network 925, or the like. The communication device 919 is, for example, a wired or wireless LAN (Local Area Network), Bluetooth (registered trademark), a communication card for WUSB (Wireless USB), or the like. Further, the communication device 919 may be a router for optical communication, a router for ADSL (Asymmetric Digital Subscriber Line), a modem for various communications, or the like. This communication device 919 can transmit and receive signals and so on in accordance with a predetermined protocol such as, for example, TCP/IP on the Internet or to/from other communication devices, for example. Further, the communication network 925 connected to the communication device 919 is configured by a network or the like, which is connected via wire or wirelessly, and may be, for example, the Internet, a home LAN, an office LAN, infrared communication, radio wave communication, satellite communication, or the like.

In the foregoing, there has been explained one example of the hardware configuration capable of achieving the functions of the arithmetic processing device 40 according to the embodiment of the present invention. Each of the above-described components may be configured using a general-purpose member, or may be configured by hardware dedicated to the function of each component. Accordingly, the hardware configuration to be used can be changed as appropriate according to the technical level at the time of implementing this embodiment.

In the foregoing, the preferred embodiments of the present invention have been explained in detail while referring to the attached drawings, but, the present invention is not limited to such an example. It is apparent that a person ordinary skilled in the art to which the present invention pertains is able to devise various variation or modification examples within the scope of the technical spirit described in the claims, and it should be understood that such examples belong to the technical scope of the present invention as a matter of course.

EXPLANATION OF CODES 1, 1a, 1b, 1c surface measurement apparatus
5 object to be measured
10 light source 11 first light source
12 second light source
20 screen
S reflected image
S1 first reflected image
S2 second reflected image
30 image capturing device
40 arithmetic processing device
50 roll
L line beam
L1 first line beam
L2 second line beam
R reflection region
R1 first reflection region
R2 second reflection region

What is claimed is:

1. A surface measurement apparatus that measures a surface of an object to be measured moving in a predetermined moving direction on a plane or a surface of an object to be measured moving in a predetermined moving direction along a curved surface of a roll, the surface being along the curved surface, the apparatus comprising:
N (N being an integer of two or more) light sources provided in a width direction, the light sources each emitting line beam over the width direction, which is a direction perpendicular to the moving direction;
a screen on which reflected images of N pieces of the line beam reflected on reflection regions of the surface of the object to be measured respectively are projected;

an image capturing device that captures the reflected image projected on the screen and acquires a captured image; and an arithmetic processing device that measures the surface of the object to be measured by using the captured image, wherein the N light sources are arranged so as to make at least incident angles of the line beams adjacent in the width direction on the surface of the object to be measured same, the N light sources are arranged so as to make positions of the reflection regions on the surface of the object to be measured in the moving direction different, and the N light sources are arranged so as to make each reflection region that is projected in which the reflection region on the surface of the object to be measured is projected in the moving direction of the object to be measured overlap an adjacent reflection region that is projected in the width direction of the object to be measured.

2. A surface measurement apparatus that measures a surface of an object to be measured moving in a predetermined moving direction on a plane or a surface of an object to be measured moving in a predetermined moving direction along a curved surface of a roll, the surface being along the curved surface, the apparatus comprising:

N (N being an integer of two or more) light sources provided in a width direction, the light sources each emitting line beam over the width direction, which is a direction perpendicular to the moving direction;

a screen on which reflected images of N pieces of the line beam reflected on reflection regions of the surface of the object to be measured respectively are projected;

an image capturing device that captures the reflected image projected on the screen and acquires a captured image; and an arithmetic processing device that measures the surface of the object to be measured by using the captured image, wherein the N light sources are arranged so as to make at least incident angles of the line beams adjacent in the width direction on the surface of the object to be measured same, the N light source are arranged so as to make positions of the reflection regions on the surface of the object to be measured in the moving direction same, and emission timings of the line beams of the N light sources and image capturing timings are controlled so as to prevent the reflected images from overlapping each other on the screen when capturing the reflected images.

3. A surface measurement apparatus that measures a surface of an object to be measured moving in a predetermined moving direction on a plane or a surface of an object to be measured moving in a predetermined moving direction along a curved surface of a roll, the surface being along the curved surface, the apparatus comprising:

N (N being an integer of two or more) light sources provided in a width direction, the light sources each emitting line beam over the width direction, which is a direction perpendicular to the moving direction;

a screen on which reflected images of N pieces of the line beam reflected on reflection regions of the surface of the object to be measured respectively are projected;

an image capturing device that captures the reflected image projected on the screen and acquires a captured image; and an arithmetic processing device that measures the surface of the object to be measured by using the captured image, wherein the N light sources are arranged so as to make at least incident angles of the line beams adjacent in the width direction on the surface of the object to be measured same, the N light source are arranged so as to make positions of the reflection regions on the surface of the object to be measured in the moving direction same, and wavelengths of the line beams that form the reflected images overlapping each other on the screen are different from each other.

4. A surface measurement method that measures a surface of an object to be measured moving in a predetermined moving direction on a plane or a surface of an object to be measured moving in a predetermined moving direction along a curved surface of a roll, the surface being along the curved surface, the method comprising:

from N (N being an integer of two or more) light sources provided in a width direction, which is a direction perpendicular to the moving direction, emitting each line beam over the width direction;

projecting reflected images of N pieces of the line beam reflected on reflection regions of the surface of the object to be measured respectively on a screen;

capturing the reflected image projected on the screen and acquiring a captured image; and measuring the surface of the object to be measured by using the captured image, wherein the N light sources are arranged so as to make at least incident angles of the line beams adjacent in the width direction on the surface of the object to be measured same, the N light source are arranged so as to make positions of the reflection regions on the surface of the object to be measured in the moving direction different, and the N light sources are arranged so as to make each reflection region that is projected in which the reflection region on the surface of the object to be measured is projected in the moving direction of the object to be measured overlap an adjacent reflection region that is projected in the width direction of the object to be measured.

5. A surface measurement method that measures a surface of an object to be measured moving in a predetermined moving direction on a plane or a surface of an object to be measured moving in a predetermined moving direction along a curved surface of a roll, the surface being along the curved surface, the method comprising:

from N (N being an integer of two or more) light sources provided in a width direction, which is a direction perpendicular to the moving direction, emitting each line beam over the width direction;

projecting reflected images of N pieces of the line beam reflected on reflection regions of the surface of the object to be measured respectively on a screen;

capturing the reflected image projected on the screen and acquiring a captured image; and measuring the surface of the object to be measured by using the captured image, wherein the N light sources are arranged so as to make at least incident angles of the line beams adjacent in the width direction on the surface of the object to be measured same, the N light source are arranged so as to make positions of the reflection regions on the surface of the object to be measured in the moving direction same, and emission timings of the line beams of the N light sources and image capturing timings are controlled so as to prevent the reflected images from overlapping each other on the screen when capturing the reflected images.

6. A surface measurement method that measures a surface of an object to be measured moving in a predetermined moving direction on a plane or a surface of an object to be measured moving in a predetermined moving direction along a curved surface of a roll, the surface being along the curved surface, the method comprising:

from N (N being an integer of two or more) light sources provided in a width direction, which is a direction perpendicular to the moving direction, emitting each line beam over the width direction;

projecting reflected images of N pieces of the line beam reflected on reflection regions of the surface of the object to be measured respectively on a screen;

capturing the reflected image projected on the screen and acquiring a captured image; and measuring the surface of the object to be measured by using the captured image, wherein the N light sources are arranged so as to make at least incident angles of the line beams adjacent in the width direction on the surface of the object to be measured same, the N light source are arranged so as to make positions of the reflection regions on the surface of the object to be measured in the moving direction same, and wavelengths of the line beams that form the reflected images overlapping each other on the screen are different from each other.

\* \* \* \* \*